(12) United States Patent  
Yamada et al.

(10) Patent No.: US 9,032,757 B2  
(45) Date of Patent: *May 19, 2015

(54) COLD-STORAGE HEAT EXCHANGER

(71) Applicant: DENSO CORPORATION, Kariya (JP)

(72) Inventors: Atsushi Yamada, Anjo (JP); Seiji Inoue, Nukata-gun (JP); Yoshio Miyata, Nagoya (JP); Naoki Yokoyama, Chiryu (JP); Etsuo Hasegawa, Nagoya (JP); Jun Abei, Obu (JP); Hiroshi Ishikawa, Nagoya (JP); Aun Ota, Okazaki (JP); Kouta Hagihara, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,857

(22) Filed: Dec. 3, 2013

(65) Prior Publication Data

US 2014/0083663 A1    Mar. 27, 2014

Related U.S. Application Data

(62) Division of application No. 12/800,979, filed on May 27, 2010.

(30) Foreign Application Priority Data

Jun. 5, 2009  (JP) ................. 2009-136630  
Apr. 16, 2010  (JP) ................. 2010-095227

(51) Int. Cl.  
*F28D 15/00*    (2006.01)  
*F28D 1/03*    (2006.01)  
(Continued)

(52) U.S. Cl.  
CPC ............. *F28D 15/00* (2013.01); *F25B 39/02* (2013.01); *F28D 1/0333* (2013.01);  
(Continued)

(58) Field of Classification Search  
CPC .............. F25B 39/002; F25B 39/022; F25B 2339/0241; F24F 5/0017; F24F 5/0021; F24F 2005/0017; F24F 2005/0032  
USPC ........... 62/285, 515, 524, 304, 434, 244, 431, 62/519, 527, 430; 165/172, 10, 41, 153  
See application file for complete search history.

(56) References Cited

U.S. PATENT DOCUMENTS 4,561,493 A    12/1985   Yanadori et al.  
5,005,368 A    4/1991    MacCracken et al.  
(Continued)

FOREIGN PATENT DOCUMENTS

DE    102004035818 A1    3/2006  
GB    1586469    3/1981  
(Continued)

OTHER PUBLICATIONS

Office Action dated Apr. 5, 2012 in corresponding Chinese Application No. 2010-10198274.8.

(Continued)

*Primary Examiner* — Mohammad M Ali  
*Assistant Examiner* — Raheena Rehman  
(74) *Attorney, Agent, or Firm* — Harness, Dickey & Pierce, PLC

(57) ABSTRACT

A cold storage heat exchanger includes multiple refrigerant tubes, a cold storage container, an inner fin, a cooling air passage and an air-side fin. The inner fin is arranged inside of the cold storage container. The cooling air passage, in which air flows to cool a space, is provided to contact a surface of the refrigerant tube on a side opposite to the cold storage container. The air-side fin is arranged in the cooling air passage and thermally connected to the refrigerant tube. The cold storage container includes multiple recess portions bonded to the inner fin, and multiple protrusion portions located on an outer side of the recess portions. The protrusion portions of the cold storage container are bonded to an outer surface of the refrigerant tube.

9 Claims, 25 Drawing Sheets

(51) Int. Cl.
*F28D 1/053* (2006.01)
*F28D 20/02* (2006.01)
*F28F 3/02* (2006.01)
*F28F 1/10* (2006.01)
*F28F 9/00* (2006.01)
*F28F 3/04* (2006.01)
*F28F 17/00* (2006.01)
*F25B 39/02* (2006.01)
*F28D 20/00* (2006.01)
*F28D 21/00* (2006.01)

(52) U.S. Cl.
CPC ............ *F28D 1/05391* (2013.01); *F28D 20/02* (2013.01); *F28D 2020/0013* (2013.01); *F28D 2021/0085* (2013.01); *F28F 3/025* (2013.01); *Y02E 60/145* (2013.01); *F28F 1/10* (2013.01); *F28F 9/00* (2013.01); *F28F 3/046* (2013.01); *F28F 17/005* (2013.01)

(56) References Cited

U.S. PATENT DOCUMENTS

| | | | |
|---|---|---|---|
| 6,170,567 | B1 | 1/2001 | Nakada et al. |
| 6,691,527 | B2 * | 2/2004 | Bureau et al. ............ 62/244 |
| 6,701,731 | B2 | 3/2004 | Aikawa et al. |
| 6,823,933 | B2 * | 11/2004 | Chiba ............ 165/153 |
| 6,854,286 | B2 | 2/2005 | Bureau et al. |
| 7,156,156 | B2 | 1/2007 | Haller et al. |
| 7,891,211 | B2 | 2/2011 | Aikawa |
| 2002/0088246 | A1 | 7/2002 | Bureau et al. |
| 2002/0088248 | A1 | 7/2002 | Bureau et al. |
| 2002/0124999 | A1 | 9/2002 | Chiba |
| 2003/0029608 | A1 | 2/2003 | Shimoya |
| 2004/0104020 | A1 | 6/2004 | Haller et al. |
| 2005/0166632 | A1 | 8/2005 | Bureau et al. |
| 2010/0051247 | A1 | 3/2010 | Sogabe et al. |

FOREIGN PATENT DOCUMENTS

| | | |
|---|---|---|
| JP | S59-013866 | 1/1984 |
| JP | 59-84377 | 6/1984 |
| JP | 59-103072 | 7/1984 |
| JP | S59-097376 | 7/1984 |
| JP | 59-115278 | 8/1984 |
| JP | 1-129587 | 9/1989 |
| JP | 01-129587 U * | 9/1989 |
| JP | 05-027581 | 4/1993 |
| JP | 1994-088688 | 3/1994 |
| JP | 08-175167 | 7/1996 |
| JP | 09-292196 | 11/1997 |
| JP | 09-318196 | 12/1997 |
| JP | 2000-055583 | 2/2000 |
| JP | 2000-205777 A | 7/2000 |
| JP | 2001-107035 A | 4/2001 |
| JP | 2001-221535 A | 8/2001 |
| JP | 2002-225536 A | 8/2002 |
| JP | 2002-274165 A | 9/2002 |
| JP | 3334386 B2 * | 10/2002 |
| JP | 2004-003787 A | 1/2004 |
| JP | 2004-184071 A | 7/2004 |
| JP | 2006-503253 A | 1/2006 |
| JP | 2007-225237 | 9/2007 |

OTHER PUBLICATIONS

Office Action issued Nov. 12, 2012 in corresponding Chinese Application No. 2010-10198274.8 with English translation.
Office Action mailed Jun. 11, 2013 in corresponding JP Application No. 2010-095227 with English translation.
Office Action dated May 13, 2014 in corresponding Japanese Application No. 2013-166579.
Office Action dated May 20, 2014 in corresponding Japanese Application No. 2013-166977.
Office Action dated May 27, 2014 in corresponding Japanese Application No. 2013-166578.
Office Action issued Jun. 19, 2014 in co-pending U.S. Appl. No. 12/800,979.
Office Action issued Jun. 24, 2014 in co-pending U.S. Appl. No. 14/094,869.
Office Action issued Jun. 19, 2014 in co-pending U.S. Appl. No. 14/094,878.
Office Action dated Dec. 24, 2014 in corresponding Japanese Application No. 2013-166578.
Office Action dated Oct. 23, 2014 in corresponding Chinese Application No. 201310188979.5.
Office Action dated Oct. 31, 2014 in corresponding Chinese Application No. 201310189967.4.

* cited by examiner

COLD-STORAGE HEAT EXCHANGER

CROSS REFERENCE TO RELATED APPLICATION

This application is a divisional of U.S. application Ser. No. 12/800,979 filed on May 27, 2010 which is based on and claims priority to Japanese Patent Applications No. 2009-136630 filed on Jun. 5, 2009, and No. 2010-095227 filed on Apr. 16, 2010, the contents of which are incorporated herein by reference in its entirety.

TECHNICAL FIELD

The present disclosure relates to a cold-storage heat exchanger used for a refrigerant cycle device.

BACKGROUND

Conventionally, a cold-storage type cooling device for a trucker nap, described in JP 8-175167A, is known. A container, in which a cold-storage material is sealed, is made of a resin film, in the cold-storage type cooling device of JP 8-175167A. A recess portion and a protrusion portion are provided on a surface of the container, and are configured such that an air passage for air cooled by the cold-storage material is formed by the recess portion.

In a cold storage time, refrigerant flows into refrigerant tubes in which the container is inserted, so as to configure an evaporator for a trucker nap. Thus, air passing through the air passage is supplied to the trucker, thereby performing a cooling operation by the evaporator.

In the above cold-storage type cooling device, an evaporator for a vehicle interior, for cooling the trucker during a vehicle running, is located separately from the evaporator for a trucker nap, such that refrigerant discharged from a compressor flows into both the evaporators in parallel.

In the above cold-storage type cooling device, a cold-storage heat exchanger used as the evaporator for a trucker nap only causes air to perform heat exchange with the cold-storage material and to flow, after being cold-stored. Thus, in order to perform the cooling of a vehicle compartment, another evaporator used as a cooling heat exchanger is required, thereby increasing the cost.

SUMMARY

The present disclosure is made in view of the above matters, and it is an object of the disclosure to provide a cold storage heat exchanger as a single heat exchanger, which can perform cold storage, cooling of a compartment due to a refrigerant tube, and cooling of the compartment due to cold release of a cold storage material, and can release cold for a sufficiently long time.

According to an aspect of the present disclosure, a cold storage heat exchanger includes a plurality of refrigerant tubes having therein refrigerant passages and being arranged to provide a clearance therebetween, a cold storage container that is bonded to the refrigerant tube and defines a compartment receiving a cold storage material, an inner fin arranged inside of the cold storage container, and a cooling air passage in which air flows to cool a space to be cooled in a cold storage time of the cold storage material and in a cold release time of the cold storage material. The cooling air passage is provided to contact a surface of the refrigerant tube on a side opposite to the cold storage container bonded to the refrigerant tube. The cold storage heat exchanger further includes an air-side fin arranged in the cooling air passage and thermally connected to the refrigerant tube. The cold storage container has a concave-convex surface and includes a plurality of recess portions bonded to the inner fin, and a plurality of protrusion portions that protrude outward on an outer side of the recess portions. The protrusion portions of the cold storage container are bonded to an outer surface of the refrigerant tube. The inner fin has a dimension to be bonded to the recess portions.

Accordingly, the cold storage and the cold release can be performed effectively and appropriately. The cold release can be performed for a sufficiently long time.

DETAILED DESCRIPTION

First Embodiment

Figure 1:
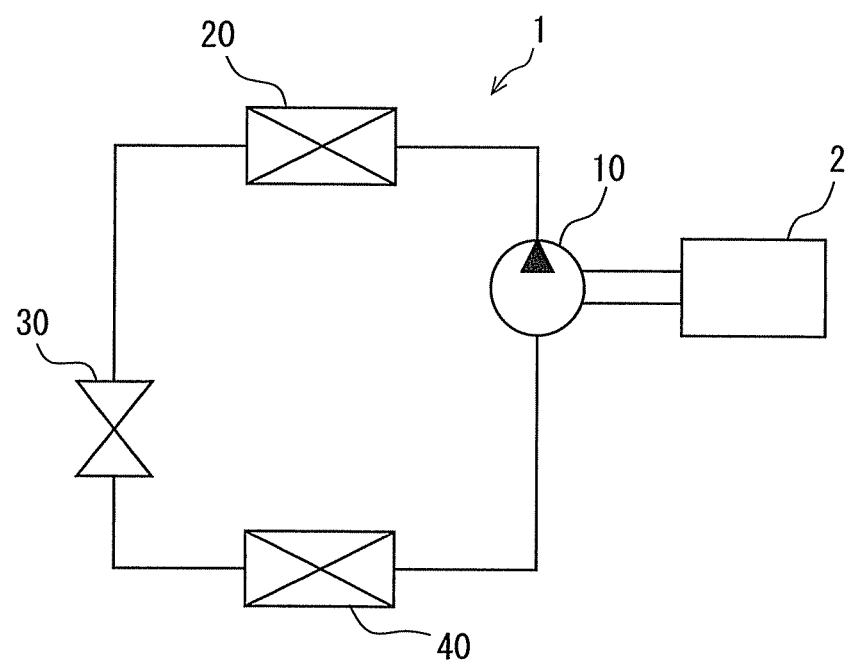
FIG. 1 is a schematic diagram showing a refrigerant cycle device for a vehicle air conditioner, according to a first embodiment of the invention.

FIG. 1 is a schematic diagram showing a refrigerant cycle device 1 for a vehicle air conditioner, according to a first embodiment of the invention. The refrigerant cycle device 1 for an air conditioner includes a compressor 10, a radiator 20, a decompression device 30 and an evaporator 40. The components of the refrigerant cycle device 1 are connected in cycle by piping, thereby configuring a refrigerant circuit.

The compressor 10 is driven by an internal combustion engine (or electrical motor etc.) that is a driving source 2 for a vehicle traveling. Thus, the compressor 10 is also stopped when the driving source 2 stops. The compressor 10 draws refrigerant flowing out of the evaporator 40, compresses the drawn refrigerant, and discharge the compressed refrigerant toward the radiator 20. The radiator 20 is configured to cool high-temperature refrigerant from the compressor 10. The radiator 20 is also called as a condenser. The decompression device 30 decompresses the refrigerant cooled by the radiator 20. The evaporator 40 evaporates the refrigerant decompressed by the decompression device 30, thereby cooling air to be blown into a vehicle compartment.

Figure 2:
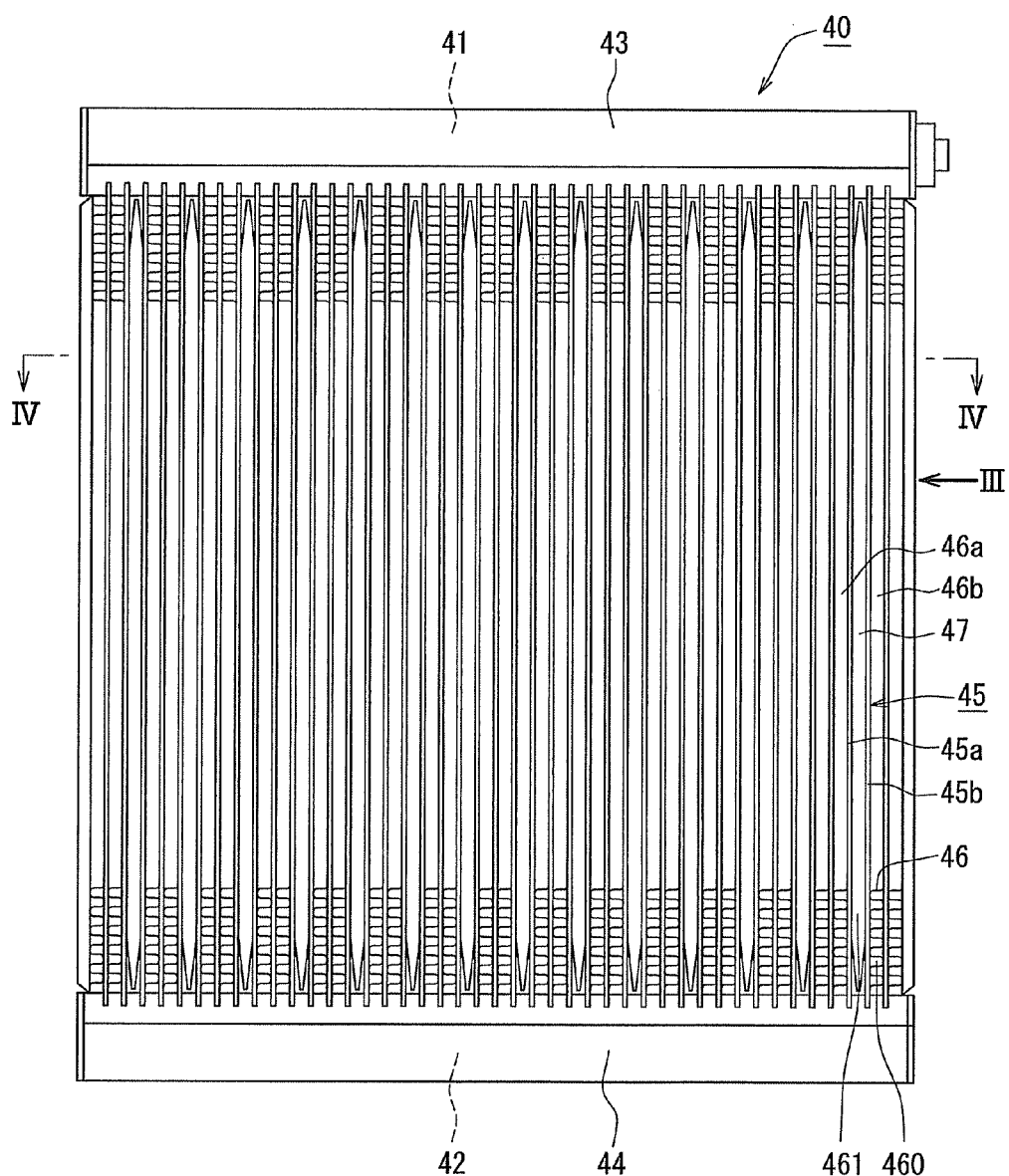
FIG. 2 is a front view showing an evaporator according to the first embodiment.
Figure 3:
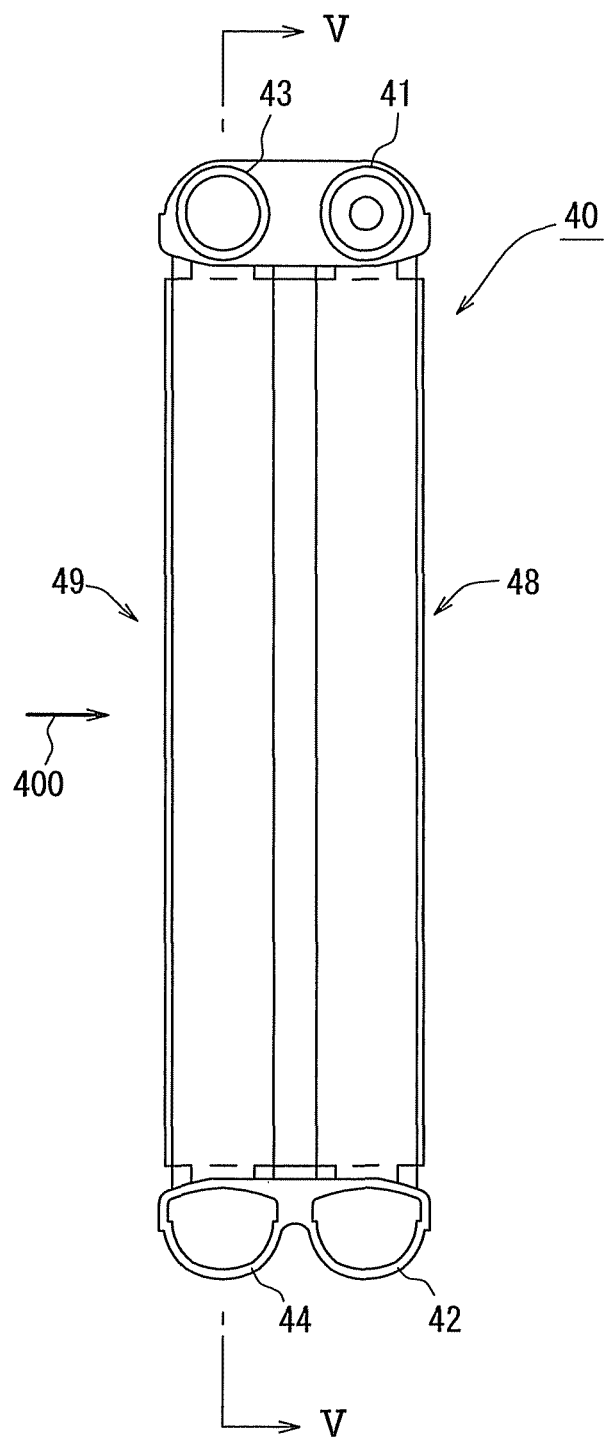
FIG. 3 is a side view showing the evaporator when being viewed from the arrow III of FIG. 2.
Figure 4:
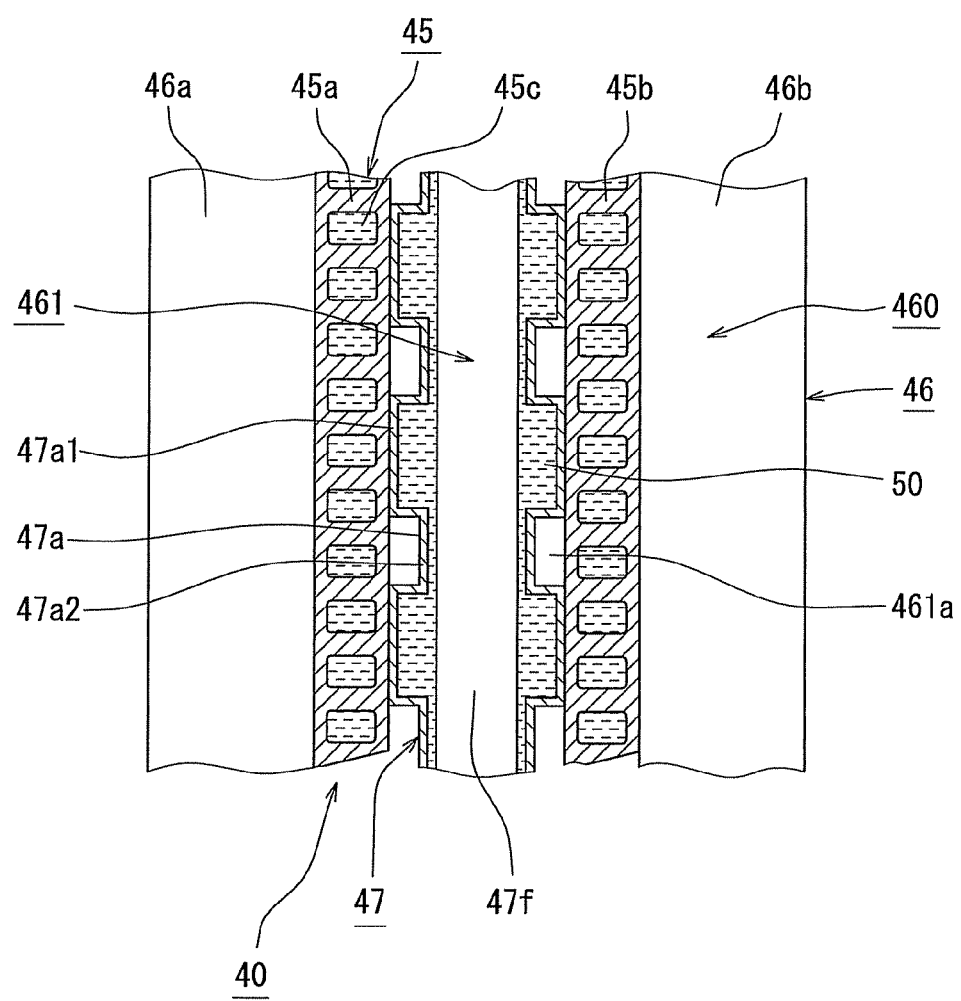
FIG. 4 is a schematic sectional view showing a part of the evaporator, in a section taken along the line IV-IV of FIG. 2.
Figure 5:
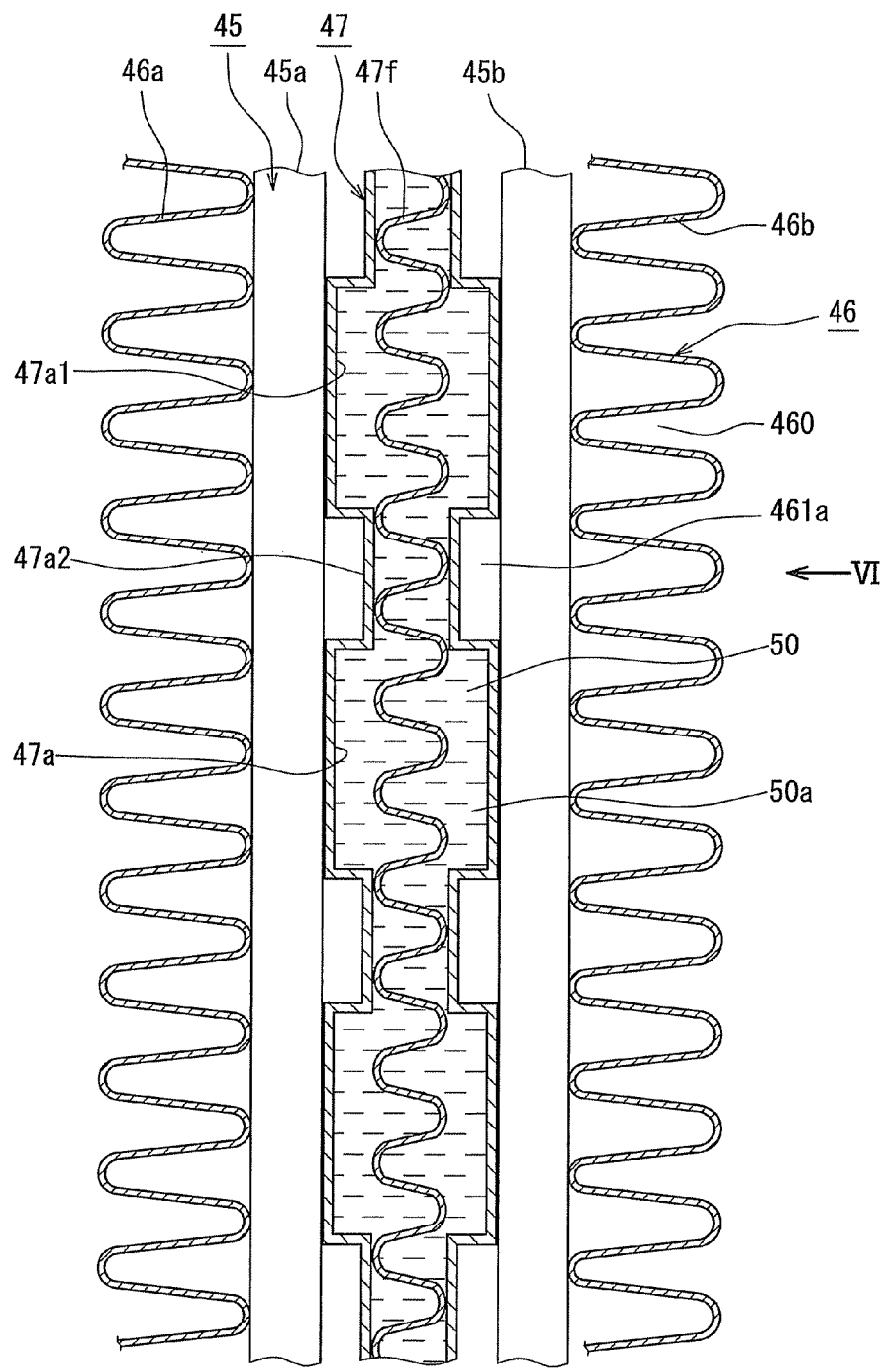
FIG. 5 is a schematic sectional view showing relationships between a refrigerant tube, a cold storage container and an air-side fin, in a section taken along the line V-V of FIG. 3.

FIG. 2 is a front view showing the evaporator 40 according to the first embodiment. FIG. 3 is a side view showing the evaporator 40 when being viewed from the arrow III of FIG. 2. FIG. 4 is an enlarged sectional view showing a part of the evaporator 40, in a section taken along the line IV-IV of FIG. 2. FIG. 5 is a schematic sectional view showing relationships between a refrigerant tube, a cold storage container and an air-side fin, in a section taken along the line V-V of FIG. 3.

In FIG. 2 and FIG. 3, the evaporator 40 includes a plurality of branched refrigerant passage members. The refrigerant passage members are made of metal such as aluminum. The refrigerant passage members are formed by headers 41, 42, 43, 44 positioned by pairs, and a plurality of refrigerant tubes 45 connected between the headers 41, 42, 43, 44.

More specifically, as shown in FIGS. 2 and 3, a first header 41 and a second header 42 are configured as a pair of header tanks, and are arranged in parallel to be separated by a predetermined distance. Furthermore, a third header 43 and a fourth header 44 are configured as a pair of header tanks, and are arranged in parallel to be separated by a predetermined distance. The refrigerant tubes 45 are arranged at the same interval between the first header 41 and the second header 42.

The refrigerant tubes 45 corresponding to the first header 41 and the second header 42 are made to communicate with the interiors of the first header 41 and the second header 42. Thus, a first heat exchange portion 48 shown in FIG. 3 is formed by the first header 41, the second header 42 and the plural refrigerant tubes 45 arranged between the first and second headers 41 and 42. The refrigerant tubes 45 are also arranged at the same interval between the third header 43 and the fourth header 44.

The refrigerant tubes 45 corresponding to the third header 43 and the fourth header 44 are made to communicate with the interiors of the third header 43 and the fourth header 44. Thus, a second heat exchange portion 49 is formed by the third header 43, the fourth header 44 and the plural refrigerant tubes 45 arranged between the third and fourth headers 43 and 44.

As a result, the evaporator 40 includes the first heat exchange portion 48 and the second heat exchange portion 49 which are arranged at two layers. With respect to the flow direction of air shown by arrow 400 in FIG. 3, the second heat exchange portion 49 is arranged at an upstream side, and the first heat exchange portion 48 is arranged at a downstream side.

A joint (not shown) is provided as a refrigerant inlet at an end portion of the first header 41 A partition plate (now shown) is located in the first header 41 approximately at a center in a longitudinal direction of the first header 41, to partition an interior space of the first header 41 into a first partition area and a second partition area. Thus, the plurality of tubes 45 is separated into a first group and a second group based on the partition position of the first header 41.

In the evaporator 40, refrigerant is firstly supplied to the first partition area of the first header 41 from the refrigerant inlet. Then, the refrigerant is distributed into the plural refrigerant tubes 45 of the first group from the first partition area of the first header 41. The refrigerant passing through the plural tubes 45 of the first group flows into the second header 42, to be joined therein.

The refrigerant flows in the second header 42, and is distributed into the plural refrigerant tubes 45 of the second group from the second header 42. Then, the refrigerant passing through the plural tubes 45 of the second group flows into the second partition area of the first header 41. Thus, in the first heat exchange portion 48, a refrigerant path, in which refrigerant flows in a U shape, is formed.

A joint (not shown) is provided as a refrigerant outlet at an end portion of the third header 43. A partition plate (now shown) is located in the third header 43 approximately at a center in a longitudinal direction of the third header 43, to partition an interior space of the third header 43 into a first partition area and a second partition area.

Thus, the plurality of tubes 45 between the third header 43 and the fourth header 44 is separated into a first group and a second group based on the partition position of the third header 43. The first partition area of the third header 43 is arranged adjacent to the second partition area of the first header 41. Furthermore, the first partition area of the third header 43 is provided to communicate with the second partition area of the first header 41.

Thus, the refrigerant flows from the second partition area of the first header 41 to the first partition area of the third header 43. Then, the refrigerant is distributed into the plural refrigerant tubes 45 of the first group of the second heat exchange portion 49 from the first partition area of the third header 43. The refrigerant passing through the plural tubes 45 of the first group flows into the fourth header 44, to be joined therein. The refrigerant flows in the fourth header 44, and is distributed into the plural refrigerant tubes 45 of the second group from the fourth header 44, in the second heat exchange portion 49.

Then, the refrigerant passing through the plural tubes 45 of the second group flows into the second partition area of the third header 43. Thus, in the second heat exchange portion 49, a refrigerant path, in which refrigerant flows in a U shape, is also formed. The refrigerant in the second partition area of the third header 43 flows from the refrigerant outlet toward the compressor 10.

In the evaporator 40, the plurality of tubes 45 are arranged approximately at certain intervals, and clearances are formed between the plural refrigerant tubes 45. A plurality air-side fins 46 and a plurality of cold-storage containers 47 are arranged in the clearances between the plural refrigerant tubes 45, to have a predetermined regularity. A part of the clearances between the refrigerant tubes 45 is used as cooling air passages 460. The remaining part in the clearances is used as receiving portions 461 in each of which the cold storage container 47 is disposed.

The receiving portions 461 are set to be in a range equal to more than 10% and equal to or lower than 50% of the total clearances formed between the plural refrigerant tubes 45. The cold storage containers 47 are arranged and distributed approximately uniformly in an entire heat exchange area of the evaporator 40. In the example of FIG. 2, two refrigerant tubes 45 positioned at two sides of the cold storage container 47 define the cooling air passages 460 for exchanging heat with air on each side opposite to the cold storage container 47.

On the other point, as shown in FIG. 4, two refrigerant tubes 45 (45a) and 45 (45b) are arranged between the two air-side fins 46a and 46b, and one cold storage container 47 is arranged between the two refrigerant tubes 45 (45a) and 45 (45b).

As shown in FIGS. 4 and 5, the refrigerant tubes 45 are multi-hole tubes each of which has a plurality of refrigerant passages extending in a tube longitudinal direction. The refrigerant tubes 45 (45a, 45b) are flat tubes. This multi-hole tube can be formed by an extrusion process. A plurality of refrigerant passages 45c shown in FIG. 4 extend in the refrigerant tube 45 in a direction perpendicular to the paper surface of FIG. 4.

The plural refrigerant tubes 45 are arranged in plural lines (e.g., two lines). In each arrangement line, the plural refrigerant tubes 45 are arranged such that the side surfaces of the tubes 45 are opposite to each other. The plural refrigerant tubes 45 are arranged to define the cooling air passages 460 for performing heat exchange with air, and the receiving portions 461 for receiving the cold storage containers 47, between adjacent two refrigerant tubes 45a and 45b.

In the evaporator 40, the air-side fins 46 is provided in the cooling air passages 460 so as to increase contact areas with air to be supplied to the vehicle compartment. In the present embodiment, the air-side fins 46 (46a and 46b) are formed by a plurality of corrugated fins.

The air-side fins 46 are thermally connected with the two adjacent refrigerant tubes 45. The air-side fins 46 are bonded to the two adjacent refrigerant tubes 45 by using a bonding material superior in the thermal transmission. For example, a brazing material can be used as the bonding material. The air-side fin 46 is a louver plate formed by bending a metal plate such as a thin aluminum plate in a wave shape.

The evaporator 40 further includes the plural cold storage containers 47. The cold storage containers 47 are made of a metal such as aluminum, for example. The cold storage container 47 is a cylindrical shape having concavities and convexities on its left and right surfaces of FIG. 4.

The cold storage container 47 is closed at its longitudinal two ends (e.g., top and bottom ends of FIGS. 2 and 5), so that a chamber for receiving therein the cold storage material 50 is partitioned and sealed as shown in FIG. 5. The cold storage container 47 has main surfaces at its two side wall portions. The two side wall portions for defining the main surfaces of the cold storage container 47 are arranged respectively in parallel with the refrigerant tubes 45.

The cold storage container 47 is disposed between adjacent two refrigerant tubes 45. The cold storage container 47 is connected thermally to the two refrigerant tubes 45 arranged adjacently at two sides of the cold storage container 47, at protrusion portions 47a1 of its outer shell 47a.

The cold storage container 47 is bonded to the two adjacent refrigerant tubes 45 by using a bonding material superior in the thermal transmission. As the bonding material, a resin material such as a brazing material or adhesive can be used. In the first embodiment, the cold storage container 47 is brazed to the refrigerant tubes 45.

A brazing material is provided between the cold storage container 47 and the refrigerant tubes 45, so as to be connected by a larger sectional area therebetween. As the brazing material, a brazing foil may be arranged between the cold storage container 47 and the refrigerant tube 45. In this case, the cold storage container 47 can be bonded to the refrigerant tube 45 to have a superior heat transmission therebetween.

The cold storage container 47 is provided with an outer shell 47a defining an outer surface of the cold storage container 47. The outer shell 47a of the cold storage container 47 is formed to have an uneven surface shape. In the present embodiment, by using the uneven surface shape, the brazing performance of the cold storage container 47 with the refrigerant tube 45 can be improved. Because of the uneven surface shape of the outer shell 47a of the cold storage container 47, the brazing area can be made smaller, thereby preventing a void or a clearance from being caused.

In FIG. 5, 47a1 indicates protrusion portion (convexities), and 47a2 indicates recess portion (concavities) of the outer shell 47a of the cold storage container 47. The protrusion portion 47a1 of the outer shell 47a of the cold storage container 47 is brazed to the refrigerant tube 45. The brazing material contains silicon (Si). By adjusting a silicon amount contained in the brazing material, a degree of flux of the brazing material flowing into a brazing portion between the cold storage container 47 and the refrigerant tube 45 can be adjusted. The brazing material can easily flow into the brazing portion as the amount of Si becomes larger in the brazing material. The recess portion 47a2 of the outer shell 47a of the cold storage container 47 defines a cold-storage side air passage 461a.

Furthermore, the uneven shape is formed in repeat by plural times in both of a longitudinal direction (top-bottom direction of FIG. 5) of the cold storage container 47 and a lateral direction (top-bottom direction of FIG. 4) of the cold storage container 47. By the uneven surface shape of the outer shell 47a of the cold storage container 47, draining performance of water such as condensed water can be improved.

As shown in FIG. 5, an inner fin 47f is arranged inside of the cold storage container 47 to be thermally and mechanically connected to an inner wall of the cold storage container 47. The inner fin 47f is bonded to the inner wall of the cold storage container 47 by using a bonding material that is superior in the heat transmission. Thus, the bonding of the inner fin 47f to the inner wall of the cold storage container 47 can be performed by brazing. Because the inner fin 47f is connected to the inner side of the cold storage container 47, it can prevent a deformation of the cold storage container 47, and pressure resistance performance can be improved in the cold storage container 47.

As shown in FIG. 5, the inner fin 47f is formed into a wave shape by bending a metal plate such as a thin aluminum plate. Because the surface of the cold storage container 47 is an uneven-shaped surface, the inner fin 47f is bonded to the recess portion 47 of the outer shell 47a of the cold storage container 47, that is, the inside protrusion portion protruding to the inside of the cold storage container 47. Therefore, mechanical strength and pressure resistance performance of the cold storage container 47 can be increased by using the inner fin 47f. Thus, the protrusion portion 47a1 of the outer shell 47a protruding outside is not bonded to the inner fin 47f. In FIG. 5, 460 indicates the cooling air passage, and 461a indicates the cold-storage side air passage.

FIG. 4 shows the inner fin 47f as a plate material when the inner fin 47f is viewed from the top side of FIG. 5. In FIG. 5, the inner fin 47f bent in a wave shape is schematically indicated. Actually, a plurality of louvers are formed in the wave-shaped fin by cutting and standing the plate material.

Figure 6:
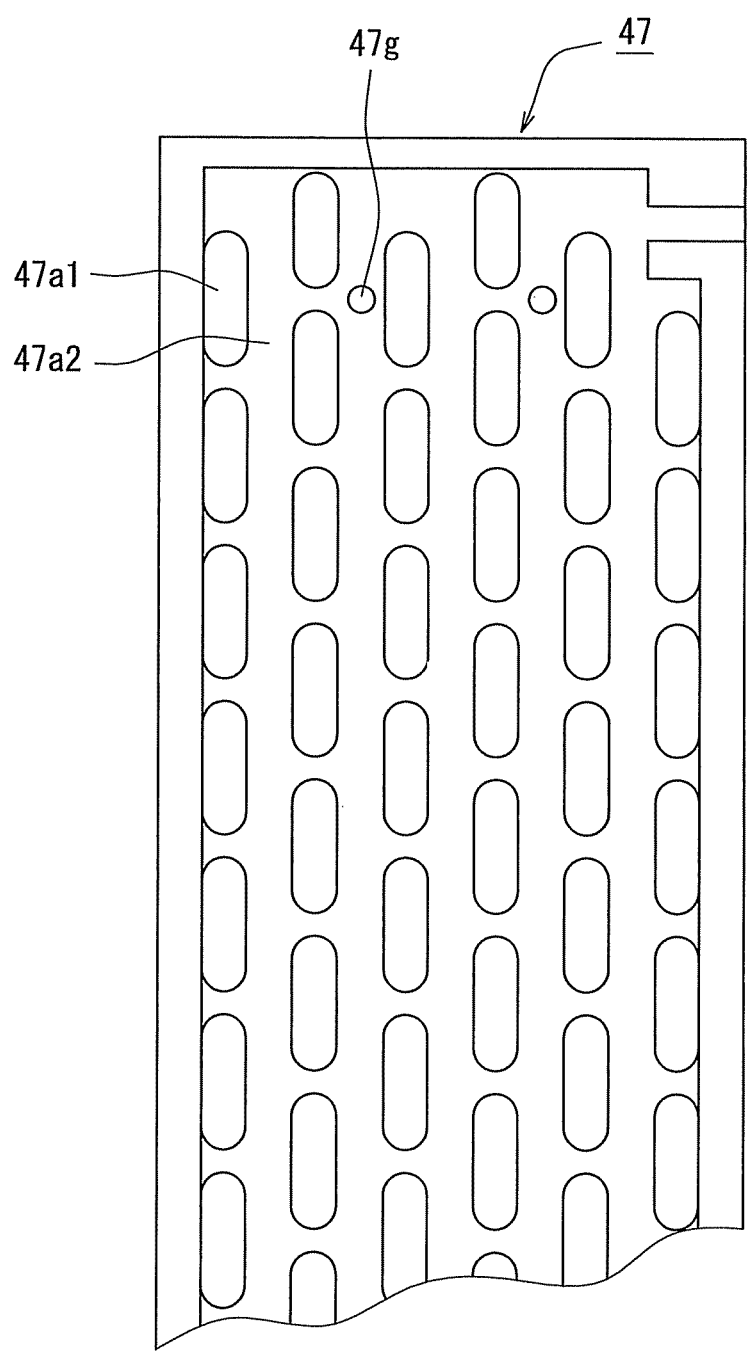
FIG. 6 is an inner side view of the cold storage container, when being viewed from the arrow VI of FIG. 5.

FIG. 6 is an inner side view of the cold storage container 47 showing an inner wall of the cold storage container 47, when being viewed from the arrow VI of FIG. 5. The cold storage container 47 molded by aluminum in FIG. 6 is a rectangular container having a height dimension of about 225 mm, a width dimension of about 50 mm, and a thickness dimension of about 5 mm, for example. The height dimension is the dimension of the cold storage container 47 in the top and bottom direction of FIG. 6. As shown in FIG. 6, the plural protrusion portions 47a1 on the container surface are formed in a zigzag arrangement. When the plural protrusion portions 47a1 are formed in the zigzag shape on the surface of the cold storage container 47, the container 47 can be easily removed from a die in a press molding. Furthermore, the lateral width dimension of the brazing portion of each protrusion portion 47a1 is set to be equal to or lower than a width of 2-5 mm, in order to prevent void.

Inside of the cold storage container 47 having the thickness about 5 mm, the inner fin 47 is disposed, as shown in FIG. 5. In FIG. 6, 47g indicates a punching-out portion configured to stop and fix the inner fin 47. The inner fin 47f and the cold storage material 50 are contained inside of the cold storage container 47 approximately to a height position where the punching-out portion 47g is provided. Furthermore, air is sealed in the interior of the cold storage container 47 at an upper side of the punching-out portion 47g. Thus, by the compression action of the air, a stress applied to the cold storage container 47 in the expansion of the cold storage material 50 can be reduced (refer to FIG. 5).

The operation effects of the first embodiment will be described. In the present embodiment, the plural recess portions 47a2 and the plural protrusion portions 47a1 are provided on the surface of the cold storage container 47. Therefore, only the outer surfaces of the protrusion portions 47a1 are used as the contact portion between the cold storage container 47 and the refrigerant tube 45. Furthermore, condensed water or a treating solution used in the evaporator surface process can be discharged easily by using the clearance between the protrusion portions 47a1 (or/and using the surfaces of the recess portions 47a2).

Figure 7:
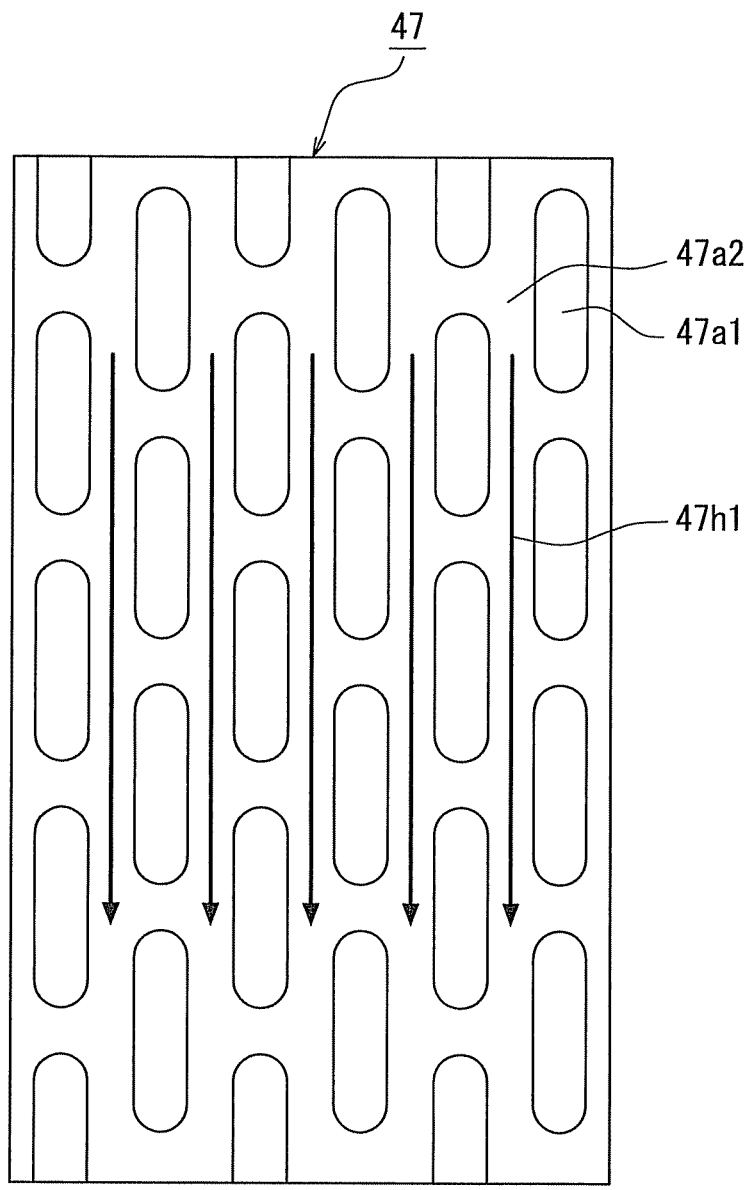
FIG. 7 is a schematic diagram for explaining a draining state of condensed water flowing downwardly when the evaporator of the first embodiment is mounted in a position of a vertical direction.

FIG. 7 is a schematic diagram for explaining a state of condensed water flowing downwardly when the evaporator is mounted to a vehicle air conditioner in a position of a vertical direction. In FIG. 7, the arrows 47h1 show the streams of the condensed water flowing in parallel from the top direction to the down direction, on the surfaces of the recess portions 47a2 of the outer shell 47a of the cold storage container 47, between the protrusion portions 47a1 arranged in a zigzag shape.

Because of the protrusion portions 47a1, it can prevent a flat contact in a wide area, thereby preventing a void generation in the brazing portion after the brazing. Therefore, the brazing performance between the cold storage container 47 and the refrigerant tube 45 can be improved.

In the present embodiment, the plural recess portions 47a2 and the plural protrusion portions 47a1 are provided on the surface of the cold storage container 47. Therefore, only the inside protrusions of the recess portions 47a2 can be made to contact the inner fin 47f of the cold storage container 47.

As a result, an inner path 50a can be secured between the inner fin 47f and the cold storage container 47. Thus, in a sealing step for sealing the cold storage material 50, a time for sealing the cold storage material 50 can be effectively shortened.

Figure 8:
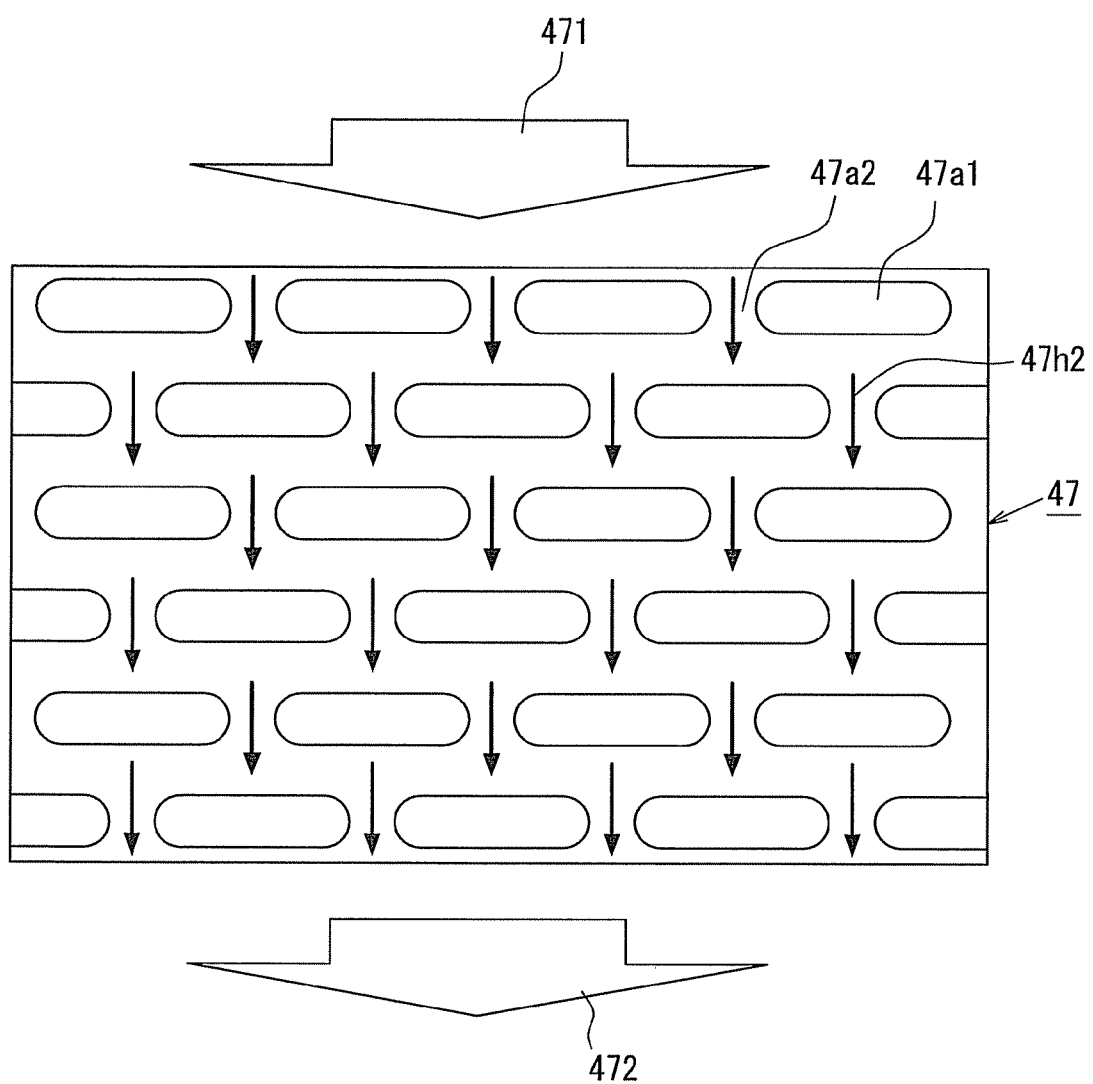
FIG. 8 is a schematic diagram for explaining a state of discharging a treating solution in a surface processing step of the evaporator.

FIG. 8 is a schematic diagram for explaining a state of removing a treating solution in a surface processing step of the evaporator. After the dipping of the cold storage container 47 is performed in a treating solution, air is blown by a blower to the cold storage container 47. In FIG. 8, the arrows 47h2 show the streams of the treating solution flowing on the surfaces of the recess portions 47a2 of the cold storage container 47 between the protrusion portions 47a1 arranged in a zigzag shape. Furthermore, 471 and 472 indicate the direction of air blown by the blower in the surface processing step.

Because the uneven shape of the cold-storage container 47 is repeated in the longitudinal direction and the lateral direction of the cold storage container 47, the draining performance can be secured regardless of the mounting angle of the evaporator. In particular, it is preferable to provide thin and long oval protrusion portions 47a1 along the longitudinal direction of the cold storage container 47, as shown in FIG. 7.

In this case, the draining performance of the condensed water, press-molding performance of the cold storage container 47, and sealing performance of the cold storage material 50 can be more improved.

Second Embodiment

Figure 9:
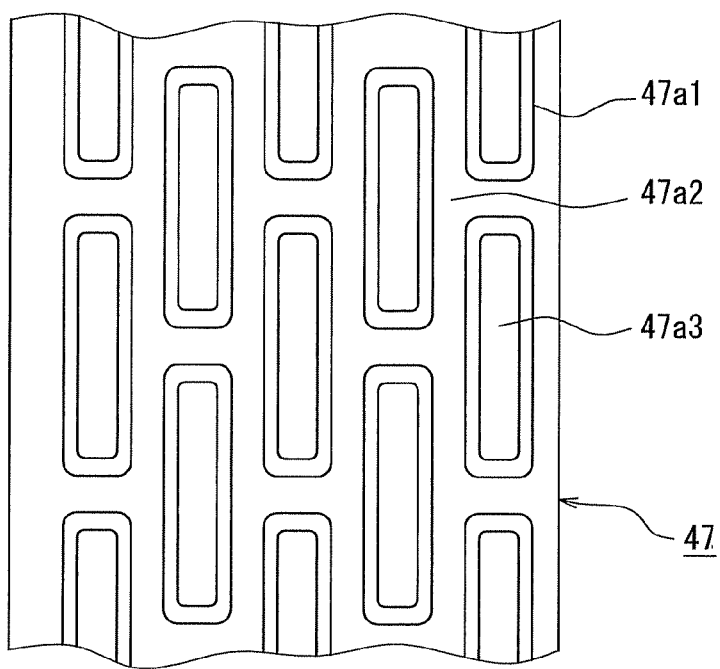
FIG. 9 is an enlarged side view showing a part of a cold storage container similar to FIG. 6, according to a second embodiment of the invention.

Next, a second embodiment of the invention will be described. FIG. 9 is a side view showing a cold storage container 47 according to the second embodiment, corresponding to that of FIG. 6. In the present embodiment and the following embodiments, a part that corresponds to a matter described in the above first embodiment may be assigned with the same reference numeral, and the explanation for the part may be omitted. Only different structures and features different from the above-described first embodiment will be mainly described in the present embodiment and the following embodiments.

Figure 10:
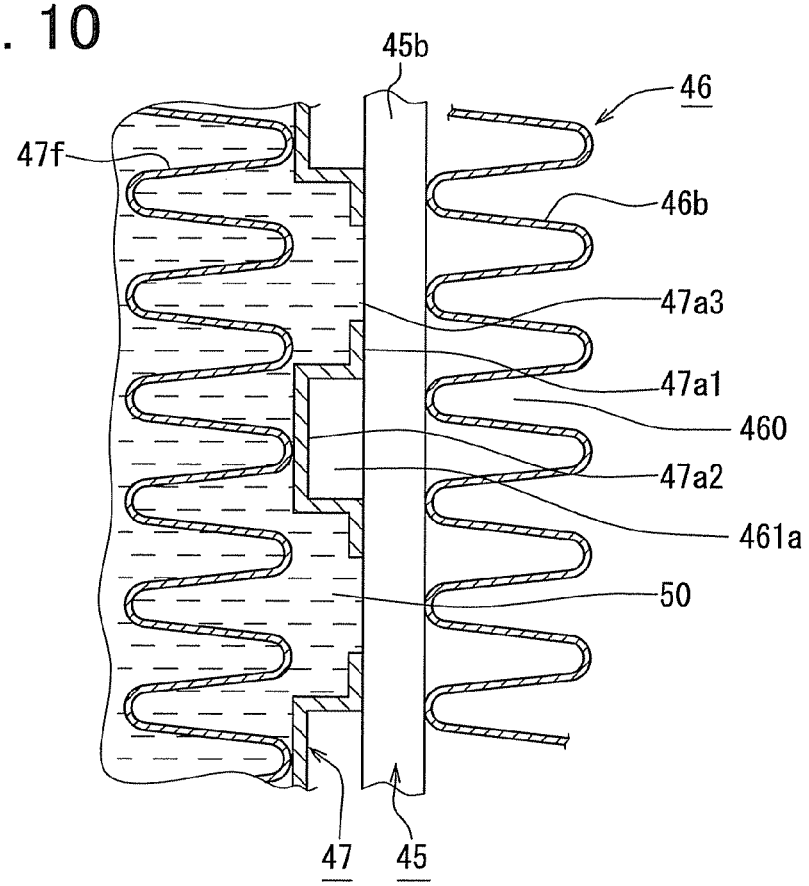
FIG. 10 is a schematic sectional view showing relationships between a refrigerant tube, a cold storage container and an air-side fin, in a section similar to FIG. 5, according to the second embodiment of the invention.

As shown in FIG. 9, in the second embodiment, the cold storage container 47 is provided with plural protrusion portions 47a1 each having an open-hole shape at its center portion (i.e., protrusion tip surface). As shown in FIG. 10, via open-hole portions 47a3 opened at the protrusion portions 47a1, the cold storage material 50 in the cold storage container 47 can directly contact the surface of the refrigerant tube 45.

Further, it is preferable to set the brazing width of the protrusion portion 47a1 in the left-right direction of FIG. 9 to be in a range of 2 mm to 5 mm.

FIG. 10 is an enlarged sectional view showing relationships between the refrigerant tube 45, the cold storage container 47 and the air-side fin 46, similarly to FIG. 5. The cold storage material 50, sealed in the cold storage container 47 together with the inner fin 47f, exposes from the inside of the cold storage container 47 into the open-hole portions 47a3, thereby directly contacting the surface of the refrigerant tube 45. In FIG. 10, 460 indicates the cooling air passage, and 461a indicates the cold-storage side air passage.

After the protrusion portions 47a1 of the cold storage container 47 are brazed to the refrigerant tube 45, the cold storage material 50 is sealed in the cold storage container 47 by the surface of the refrigerant tube 45. Thus, it can prevent the cold storage material 50 from leaking from the open-hole portions 47a3 of the cold storage container 47.

A contact area is set at 100% as a reference, if all the outer surface of a cold storage container 47 without an uneven shape (i.e., without the recess portions 47a2 and the protrusion portions 47a1) or without the open-hole portion 47a3 is used as the contact surface contacting the surface of the refrigerant tube 45. In this case, when the uneven shapes or/and the hole-open portions 47a3 are provided in the outer surface of the cold storage container 47 so that the contact area of the cold storage container 47 partially contacting the refrigerant tube 45 becomes equal to or larger than 10% (more preferably, equal to or larger than 20%) as in the first and second embodiments, the heat exchanging capacity can be sufficiently obtained in the evaporator for an air conditioner, as described later. Here, the contact area corresponds to a brazing area.

Figure 11:
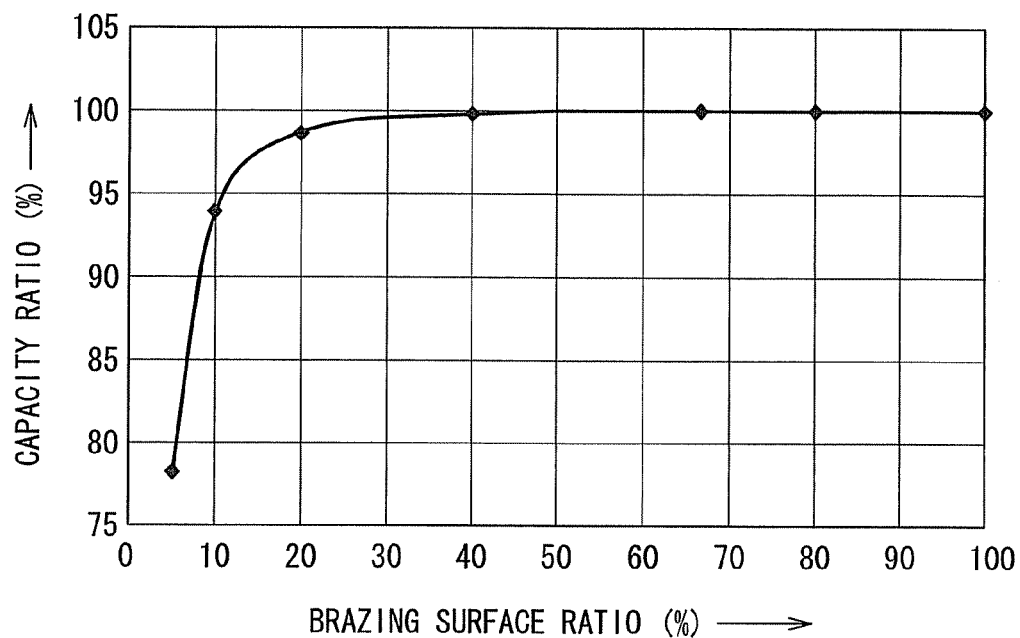
FIG. 11 is a characteristic diagram showing relationships between a capacity ratio of the evaporator, and a brazing surface ratio between the cold storage container and the refrigerant tube, in the above first embodiment and the above second embodiment of the invention.

FIG. 11 is a characteristic diagram showing relationships between a capacity ratio of the evaporator, and a brazing surface ratio between the cold storage container 47 and the refrigerant tube 45. In FIG. 11, the capacity ratio of the evaporator is set at 100%, when the brazing area ratio is set at 100% in a case where all the outer surface of the cold storage container 47 without an uneven shape or without the open-hole portion 47a3 is used as the contact surface contacting the surface of the refrigerant tube 45. As shown in FIG. 11, even when the cold storage container 47 is provided with the uneven shape or the open-hole portions at the protrusion portions 47a1, when the ratio of the brazing area partially contacting the refrigerant tube 45 is set equal to or larger than 10%, the capacity ratio of the evaporator can be maintained equal to or larger than 90%.

In a case where the open-hole portions 47a3 are provided, it is preferable to use a brazing material formed on the inner surface of the cold storage container 47 to be different from a brazing material formed on the outer surface of the cold storage container 47, as the brazing materials used at the brazing portion between the cold storage container 47 and the refrigerant tube 45. The fluidity of the brazing material becomes larger, as an amount of silicon Si contained in the brazing material becomes larger.

Figure 12:
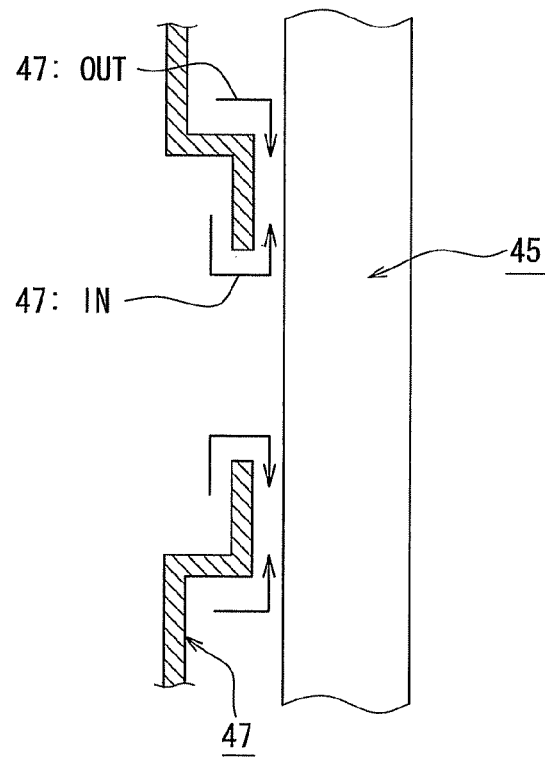
FIG. 12 is a schematic diagram for explaining a flow of a brazing material in the structure of FIG. 10.

FIG. 12 is a schematic diagram for explaining a flow of a brazing material in the structure of FIG. 10. In FIG. 12, arrow 47IN indicates a flow of an inner-surface brazing material formed on an inner surface of the cold storage container 47, and arrow 47OUT indicates a flow of an outer-surface brazing material formed on an outer surface of the cold storage container 47.

The fluidity of the brazing material becomes larger, as an amount of silicon Si contained in the brazing material becomes larger. When the fluidity of the inner-surface brazing material of the cold storage container 47 is made higher than the fluidity of the outer-surface brazing material of the cold storage container 47, the brazing of the cold storage container 47 to the refrigerant tube 45 can be preferably performed. The reason will be explained below.

The outer-surface brazing material of the cold storage container 47 includes a sacrificial anticorrosion material. By limiting the fluidity of the outer-surface brazing material flowing into between the cold storage container 47 and the refrigerant tube 45, the brazing at a necessary portion due to the outer-surface brazing material can be secured, and it is preferable to improve the anticorrosion performance of the brazing portion between the cold storage container 47 and the refrigerant tube 45. Thus, in the present embodiment, the silicon Si amount is made larger in the inner-surface brazing material of the cold storage container 47 than that in the outer-surface brazing material of the cold storage container 47, thereby increasing the fluidity of the inner-surface brazing material shown by the arrow 47IN in FIG. 12.

In the present embodiment, because the brazing of the brazing portion between the cold storage container 47 and the refrigerant tube 45 is performed by using both the flow of the inner-surface brazing material flowing from the inner surface of the cold storage container 47 and the flow of the outer-surface brazing material flowing from the outer surface of the cold storage container 47, the bonding performance of the cold storage container 47 to the refrigerant tube 45 can be effectively obtained and maintained.

Modification of the Above-Described First and Second Embodiments

Figure 13:
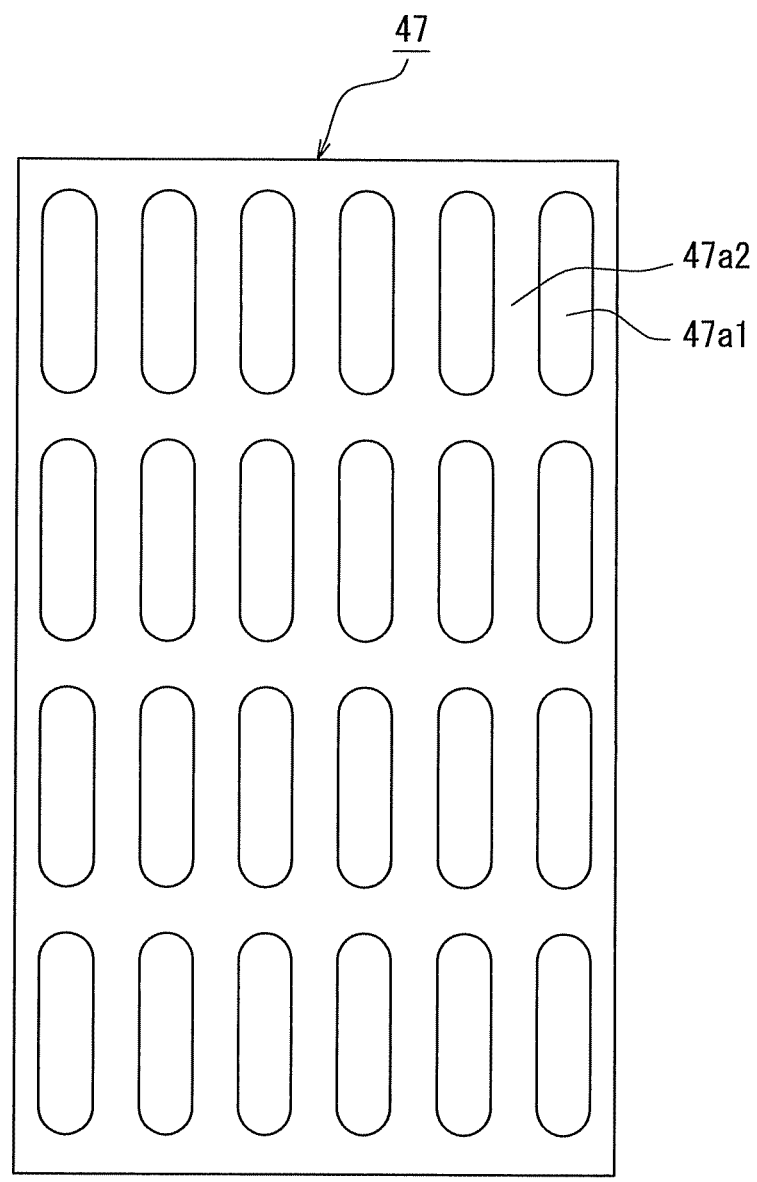
FIG. 13 is a side view of a cold storage container having an uneven shape of a lattice arrangement, as an example of another embodiment of the invention.
Figure 14:
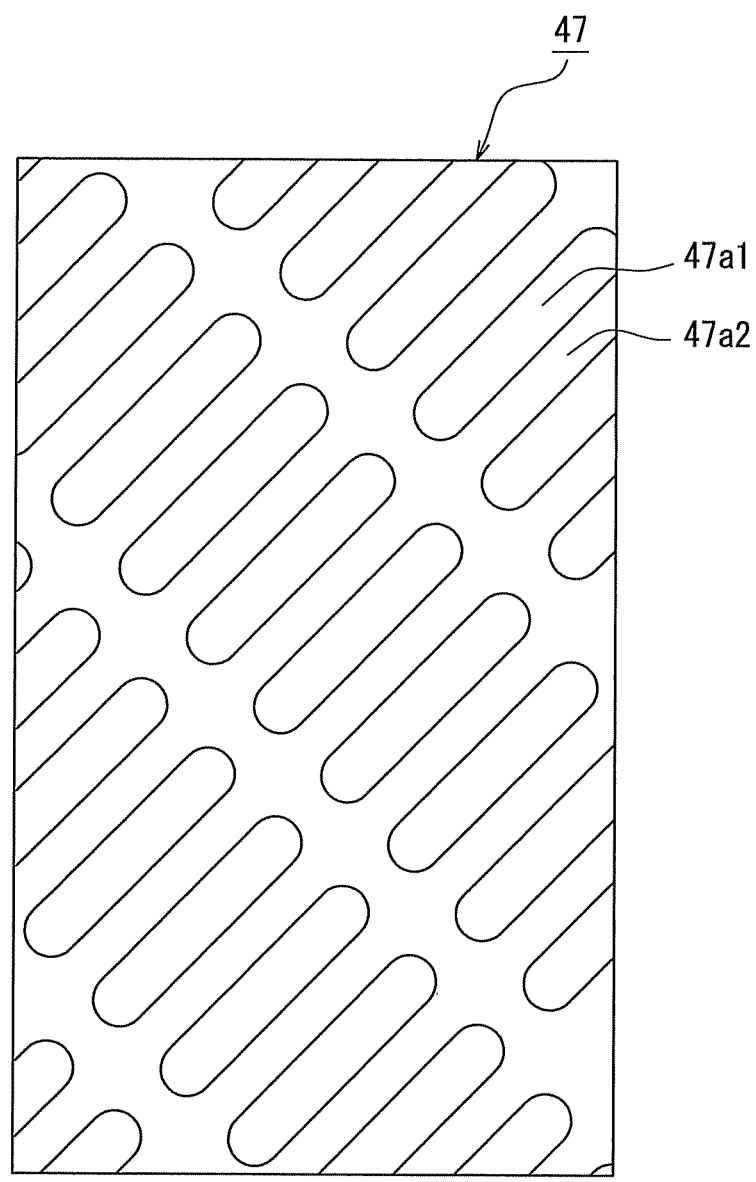
FIG. 14 is a side view of a cold storage container having an uneven shape of an oblique arrangement, as an example of another embodiment of the invention.
Figure 15:
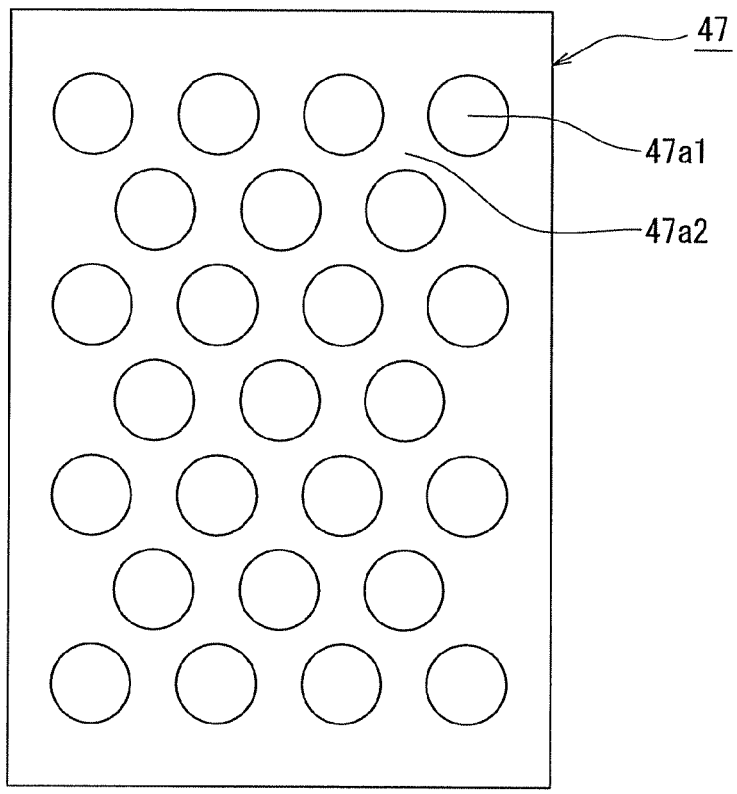
FIG. 15 is a side view of a cold storage container having an uneven shape of a zigzag arrangement, as an example of another embodiment of the invention.
Figure 16:
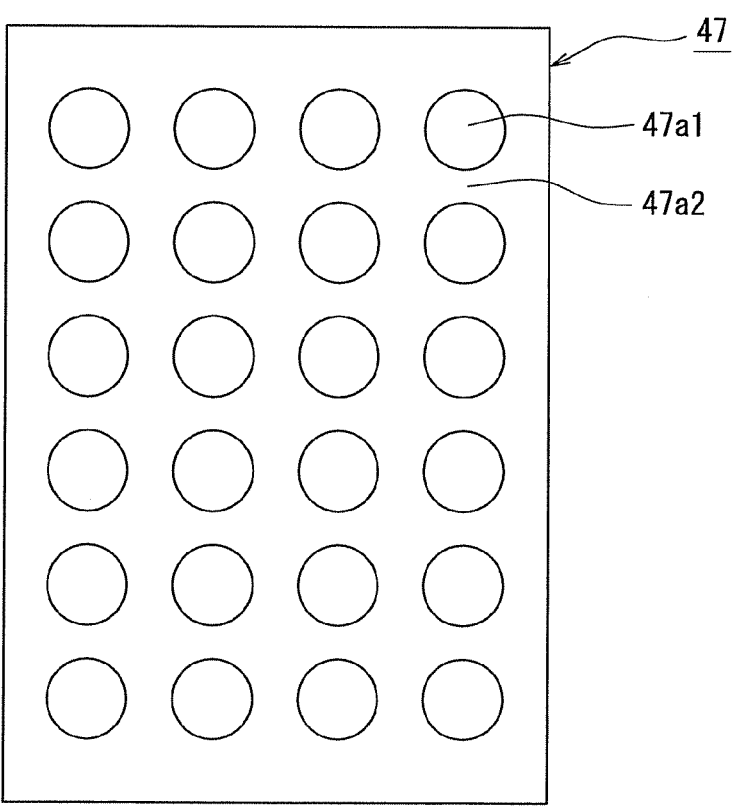
FIG. 16 is a side view of a cold storage container having an uneven shape of a round lattice arrangement, as an example of another embodiment of the invention.

The invention is not limited to the above-described embodiments, but the following changes and modifications will become apparent to those skilled in the art. For example, in the above-described first embodiment, the zigzag uneven shape is formed on the surface of the cold storage container 47. However, as shown in FIG. 13, a grill-arrangement oval-uneven shape may be formed on the surface of the cold storage container 47. Moreover, an uneven shape of the cold storage container 47 may be an oval-shaped slanting arrangement shown in FIG. 14, may be a round zigzag arrangement shown in FIG. 15, or may be a round grill arrangement shown in FIG. 16.

Third Embodiment

Figure 17:
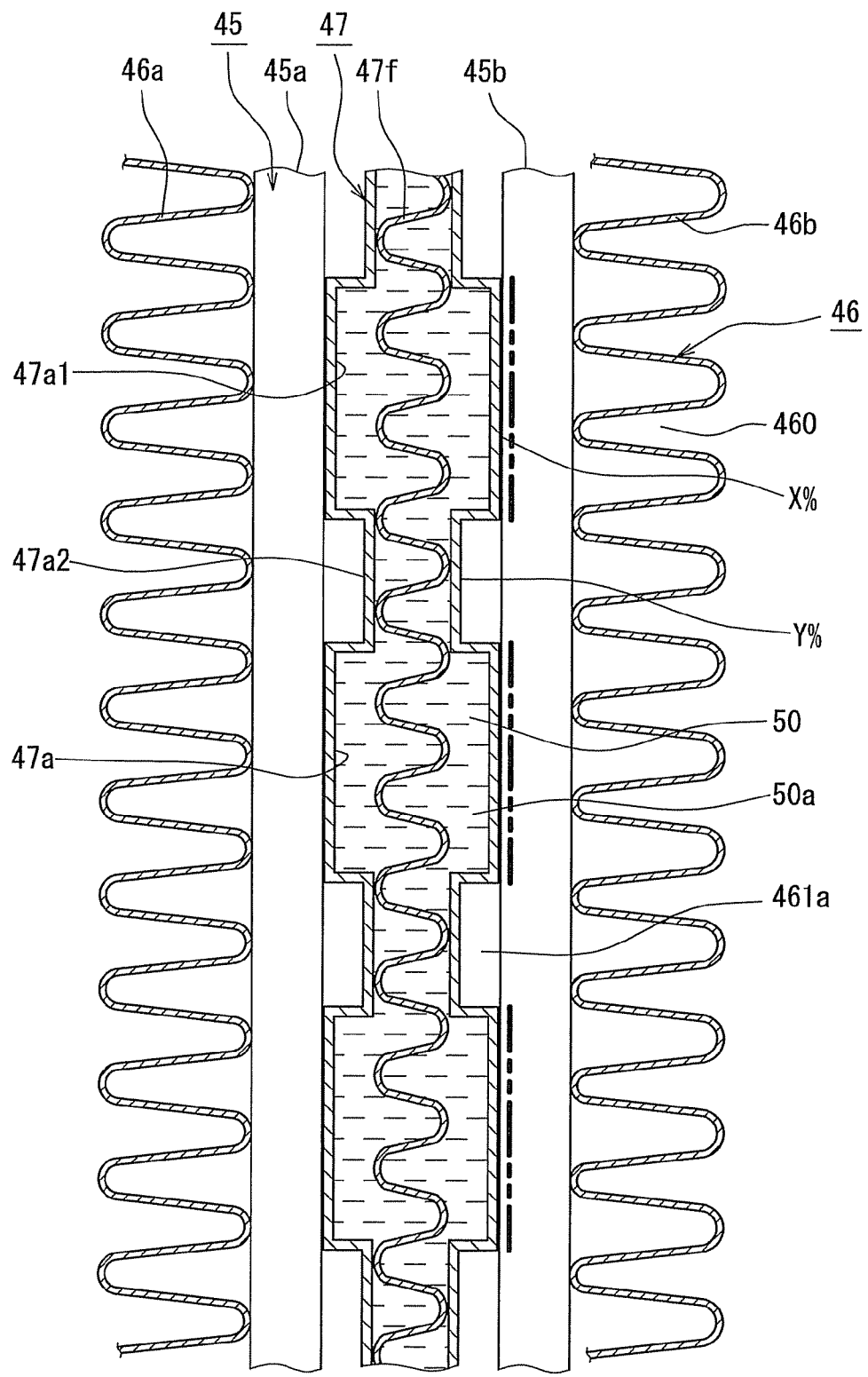
FIG. 17 is a schematic sectional view showing relationships between a refrigerant tube, a cold storage container and an air-side fin, in a section taken along the line V-V of FIG. 3, according to a third embodiment of the invention.

FIG. 17 is an enlarged sectional view showing relationships between a refrigerant tube, a cold storage container and an air-side fin, according to a third embodiment, in a section taken along the line V-V of FIG. 3 similarly to FIG. 5. In the third embodiment, a bonding ratio of the outer surface of the cold storage container 47 or a bonding ratio of the inner surface of the cold storage container 47 is set in a predetermined range.

In FIG. 17, 460 indicates a cooling air passage, and 461a indicates a cold-storage side air passage. In a case where the surface of the cold storage container 47 is configured to have ribs of an uneven shape, when an area ratio of the outer surface of the cold storage container 47 defining the protrusion portions 47a1 is set at X %, and when an area ratio of the inner surface of the cold storage container 47 defining the recess portion 47a2 is set at Y %, X+Y=100%. Here, the outer surface of the cold storage container 47 defining the protrusion portion 47a1 is the portion of the virtual lines indicated by the chain lines in FIG. 17. In contrast, the inner surface of the cold storage container 47 defining the recess portion 47a2 is the portion of the cold storage container 47 contacting the inner fin 47f.

As shown in FIG. 17, the inner fin 47f having a uniform width is provided in the cold storage container 47. By forming the uneven shape of the surface of the cold storage container 47, the inner fin 47f is made to partially contact the inner surface of the cold storage container 47 and to partially not contact the inner surface of the cold storage container 47. When the area ratio X of the virtual line portion of the cold storage container 47 is large, that is, when the area ratio Y of the recess portion 47a2 is small, a ratio of the non-contact area between the cold storage container 47 and the inner fin 47f becomes large, thereby reducing the performance of the heat exchanger (e.g., evaporator).

On the other hand, when the area ratio X of the virtual line portion is small, that is, when the area ratio Y is large, it is difficult to have a sufficient contact area between the cold storage container 47 and the refrigerant tubes 45 (45a, 45b). In this case, the amount of the cold storage material and the amount of the brazing material can be made small, but heat exchanging performance of a cold storage heat exchanger (e.g., evaporator) is reduced.

The inner fin 47f is bent in a wave shape to have ending portions, so that the tip portions of the bending portions partially contact the inner surface of the cold storage container 47. The wave height of the bending portions (i.e., the width of the inner fin 17 in the left-right direction of FIG. 17) is made uniform. When the wave height of the bending portions of the inner fin 47f is made uniform, the inner fin 47f can be easily manufactured and assembled.

Figures 18A, 18B:
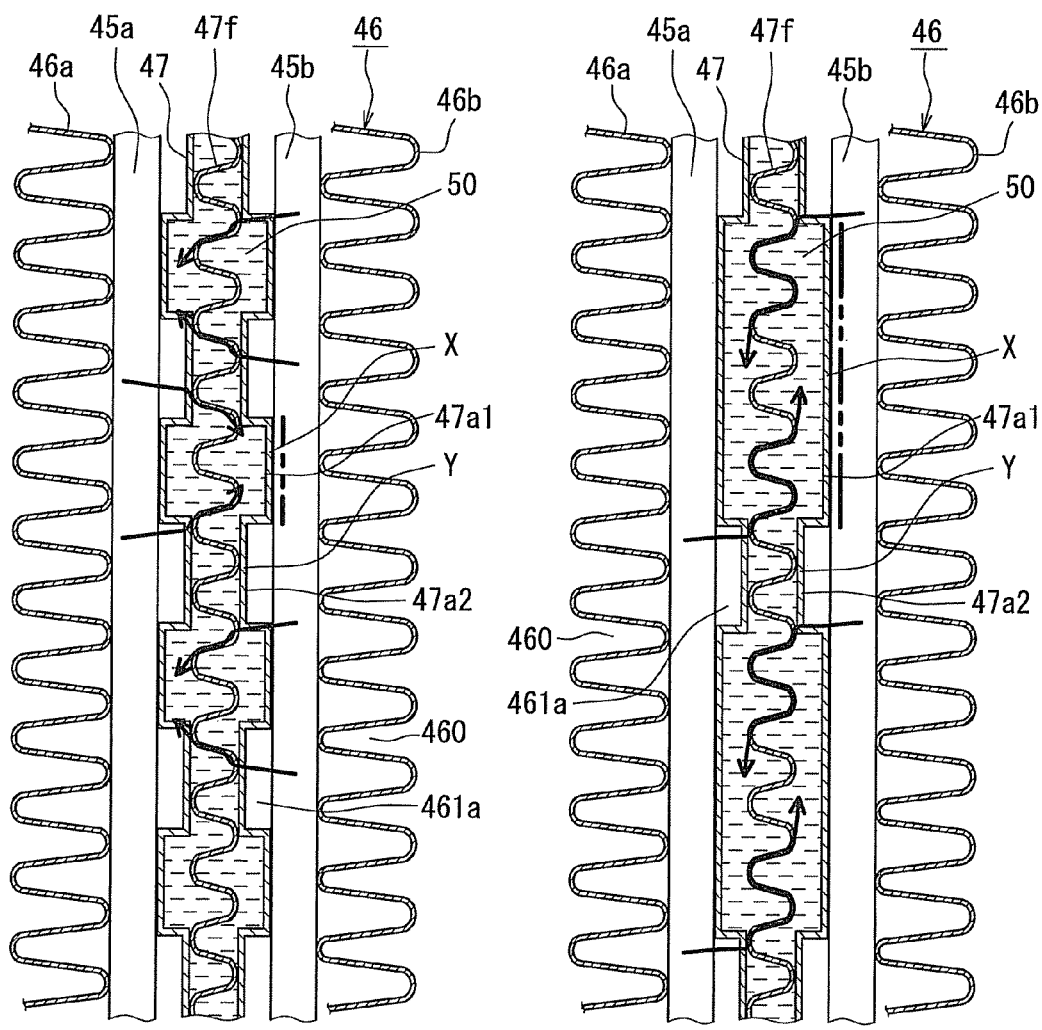
FIGS. 18A and 18B are sectional views for explaining a performance decrease due to a bonding ratio between an inner fin and a cold storage container of an evaporator according to the third embodiment, in which FIG. 18A indicates a case where an outer surface bonding ratio X is suitably small, and FIG. 18B indicates a case where the outer surface bonding ratio X is too large.

FIGS. 18A and 18B are schematic diagrams for explaining a decrease in heat exchange performances due to the bonding ratio between the inner fin 47f and the cold storage container 47. FIG. 18A shows a case where the area ratio (bonding ratio) X of the outer surface of the cold storage container 47 is in a suitable range, and FIG. 18B shows a case where the bonding ratio X of the outer surface of the cold storage container 47 is too large.

In the case of FIG. 18A, the heat transmission distance from the refrigerant tubes 45a, 45b to the inner fin 47f and to the cold storage material 50 is made shorter, thereby increasing heat transmission amount. In contrast, in the case of FIG. 18B, the heat transmission distance from the refrigerant tubes 45a, 45b to the inner fin 47f and to the cold storage material 50 is made longer, thereby decreasing heat transmission amount.

Because of the uneven portion is provided in the cold storage container 47, a part of the inner fin 47f does not contact the cold storage container 47, and is not brazed to the inner wall of the cold storage container 47. Thus, the performance of the cold storage heat exchanger is changed by the uneven shape and dimension.

Figure 19A:
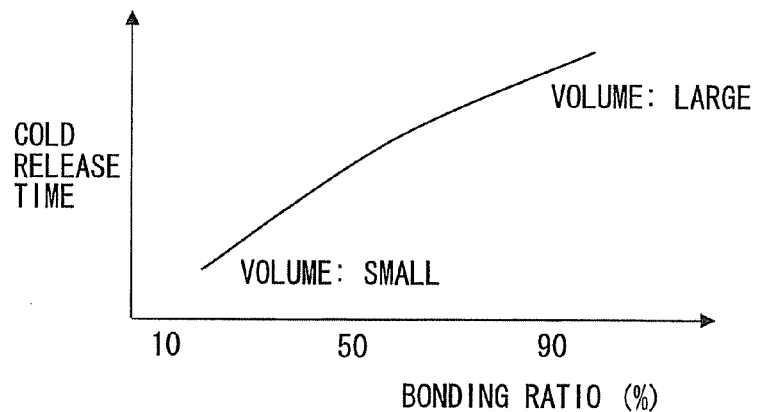
FIGS. 19A, 19B and 19C are graphs for explaining performances due to the bonding ratio between the inner fin and the cold storage container of the evaporator according to the third embodiment.
Figure 19B:
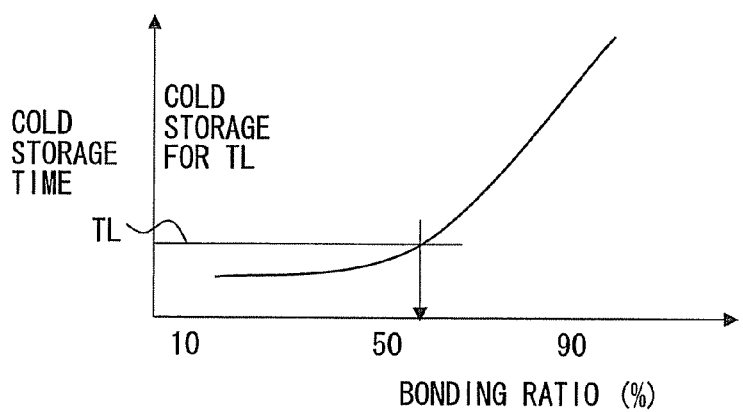
Figure 19C:
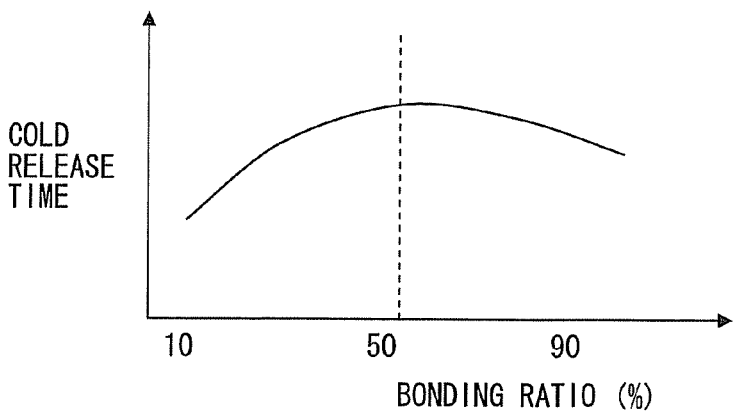

FIGS. 19A, 19B and 19C are graphs for explaining the heat exchange performances due to the bonding ratio between the inner fin 47f and the cold storage container 47. FIG. 19A is a graph showing the relationship between a bonding ratio X and a cold release time after the cold storage material 50 is sufficiently cold-stored. FIG. 19B is a graph showing the relationship between the bonding ratio X and a cold storage time (Seconds). FIG. 19C is a graph showing the relationship between a bonding ratio X and a cold release time (Seconds) when the cold storage is performed for a limited time and is not completely finished.

In FIGS. 18A-18B and FIGS. 19A-19C, when the bonding ratio X becomes larger, the volume of the cold storage material 50 at a portion adjacent to the bonding portion is increased. Therefore, in a case where cold storage is sufficiently performed for the cold storage material 50, the cold release time becomes larger as the bonding ratio X increases, as in the graph of FIG. 19A.

Here, the time for solidifying all the cold storage material 50 is defined as the cold storage time. In this case, when the bonding ratio X becomes larger as in FIG. 18B, the heat transmission path for transmitting heat to the inside of the cold storage material 50 becomes longer as in FIG. 18B, and thereby the heat exchange efficiency of the air-side fins 46 (46a, 46b) is decreased.

Therefore, as in the graph of FIG. 19B, when the bonding ratio X is large, the cold storage time becomes pretty large. Furthermore, the time, for which the cold storage can be performed, is a limited time having a relation with the driving time of a vehicle. Therefore, it is necessary to effectively use the cold storage material 50 mounted in the vehicle, and to completely perform the cold storage of the cold storage material 50. In the graph of FIG. 19B, TL indicates the above-described limited time.

FIG. 19C is a graph showing the cold release time when the cold storage is performed in the limited time TL. As in the graph of FIG. 19C, the cold release time becomes maximum at the bonding ratio of about 50%. As in the graphs of FIGS. 19A-19C, in order to effectively perform the cold storage in the limited time and in order to secure the cold release time by a small amount of the cold storage material 50, it is preferable to set the bonding ratio X at 50% or lower.

With respect to the outside surface (X+Y portion) of the cold storage container 47, it is preferable to set the ratio X of the contact area to be in a range of 20% to 50%, when the cold storage container 47 is partially bonded to the outer surface of the refrigerant tube 45. In this case, it is possible to limit a decrease in the heat exchange performance of the cold-storage heat exchanger to be in a range equal to smaller than 1%, while the ratio X of the contact area can be made small.

Furthermore, the contact ratio between the cold storage container 47 and the refrigerant tube 45 is set so that a sufficient heat transmission amount can be secured therebetween. Thus, it is possible to store the thermal amount in the cold storage material 50 in a limited time, and the cold release can be performed for a sufficient long time by using the stored thermal quantity. Accordingly, when the vehicle engine is stopped at the red light of a traffic intersection, a supplemental air-conditioning effect for a vehicle compartment can be increased.

Fourth Embodiment

Next, a fourth embodiment of the invention will be described. In the above-described embodiments, the plural protrusion portions 47a1 or the plural recess portions 47a2 are formed in the cold storage container 47, so as to have uneven shapes shown in any one of FIGS. 6, 7, 8, 9, 13, 14, 15 and 16. However, in the fourth embodiment, ribs composed of plural protrusion portions 47a1 are formed into reverse-V shapes (slanting shapes).

Figure 20:
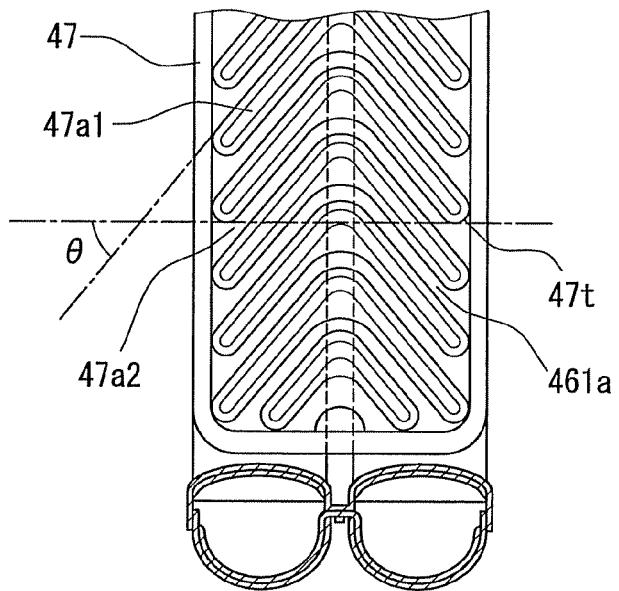
FIG. 20 is a side view showing a part of rib shape on a surface of a cold storage container in an evaporator, according to a fourth embodiment of the invention.

FIG. 20 shows the shape of ribs formed on the surface of the cold storage container 47 according to the fourth embodiment of the invention. The cold storage container 47 is assembled to a vehicle, such that the lower side of the cold storage container 47 in FIG. 20 is positioned on the bottom side in the top-bottom direction of the vehicle. The plural protrusion portions 47a1 or the plural recess portions 47a2 are formed on the surface of the cold storage container 47, respectively in a mountain shape having a top portion and two slanting portions at two sides of the top portion, so that condensed water flows downwardly from the top portion to be separated at the left and right two sides of the top portion.

Because the protrusion portions 47a1 or the recess portions 47a2 are formed in slanting shapes, the condensed water generated on the surface of the cold storage container 47 can be separated into the left and right sides from the mountain-shaped top portion, and can be promptly discharged outside along the slanting portions. Thus, it can prevent the refrigerant tube 45 and the cold storage container 47 from being broken due to the volume expansion of the frozen condensed water, thereby preventing a freezing crack.

Thus, even when the condensed water remains on the surface of the cold storage container 47 and is frozen thereon, the frozen ice can be easily removed, thereby preventing the freezing crack. Because condensed water can flow along the slanting portions separated into the left and right sides, the length of the slanting portions can be made shorter, thereby improving the discharge performance of the condensed water.

Specifically, the protrusion portions 47a1 or the recess portions 47a2 are formed on the surface of the cold storage container 47 such that a protrusion height of the rib of the slanting shape is equal to or more than 0.2 mm. Furthermore, a rib pitch, which is a clearance between adjacent protrusion portions 47a1 or a clearance between adjacent recess portions 47a2, is set equal to or more than 3 mm. In addition, the plural ribs are overlapped by plural layers equal to or more than three, from the top direction of the cold storage container 47 toward the bottom direction of the cold storage container 47.

When the air-conditioning of the vehicle compartment is performed by using the cold-storage container 47, condensed water may stay in the cooling fin 46 within the cooling air passage 47 (see FIG. 17 or the like), and in the cold-storage side air passage 461a between the refrigerant tube 45 integrated with the cooling fin 46 and the cold storage container 47. In this case, when the frost of the condensed water is caused in a low load, the cold storage container 47 and the refrigerant tube 45 may be broken.

In the fourth embodiment, the ribs composed of the reverse V-shaped protrusion portions 47a1 are arranged between the refrigerant tube 45 and the cold storage container 47, so as to reduce the amount of condensed water staying in the space between the refrigerant tube 45 and the cold storage container 47.

Thus, it can prevent condensed water on an upper side of the cold storage container 47 from flowing into the reverse V-shaped rib on a lower side of the cold storage container 47. As a result, the amount of the condensed water staying between the refrigerant tube 45 and the cold storage container 47 can be reduced. Furthermore, even when the freezing of the condensed water is caused, it can remove the generated ice to an outer side (i.e., paper face-back direction of FIG. 17) from the space between the refrigerant tube 45 and the cold storage container 47.

Fifth Embodiment

Figure 21:
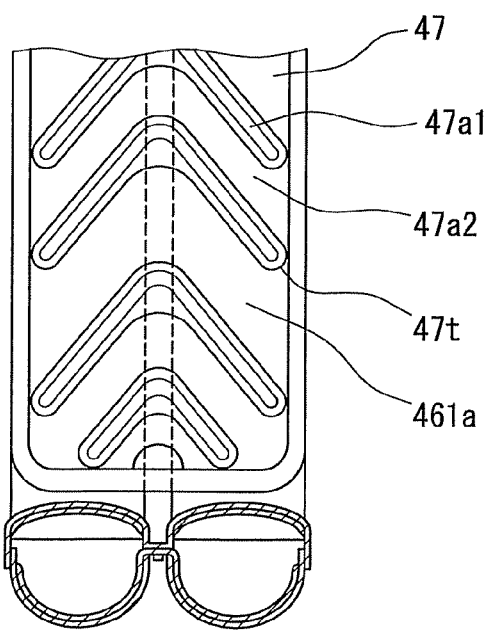
FIG. 21 is a side view showing a part of rib shape on a surface of a cold storage container in an evaporator, according to a fifth embodiment of the invention.

Next, a fifth embodiment of the invention will be described. FIG. 21 shows the shape of ribs on the surface of the cold storage container 47 according to the fifth embodiment of the invention. The cold storage container 47 is assembled to a vehicle, such that the lower side of the cold storage container 47 in FIG. 21 is positioned on the bottom side in the top-bottom direction of the vehicle. In the above-described fourth embodiment, the ribs are arranged substantially by the same pitch to be overlapped from the top direction to the bottom direction of the cold storage container 47. However, in the fifth embodiment, as shown in FIG. 21, the ribs are arranged by different pitches to be overlapped from the top direction to the bottom direction of the cold storage container 47.

Sixth Embodiment

Figure 22:
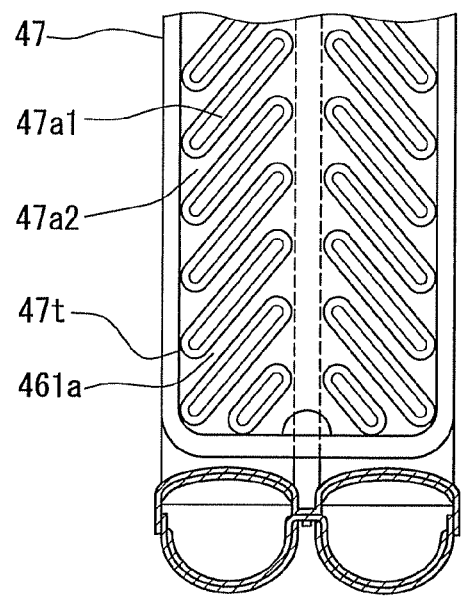
FIG. 22 is a side view showing a part of rib shape on a surface of a cold storage container in an evaporator, according to a sixth embodiment of the invention.

Next, a sixth embodiment of the invention will be described. FIG. 22 is a side view showing a part of rib shapes formed on a surface of a cold storage container 47 in an evaporator, according to a sixth embodiment of the invention. In the above-described fourth and fifth embodiments, the ribs are arranged to be overlapped from the top direction to the bottom direction of the cold storage container 47, such that the left and right slanting shapes are continuously formed in each rib. However, in the sixth embodiment, as shown in FIG. 22, the ribs of the slanting shapes are arranged on the surface of the cold storage container 47 such that left and right slanting shapes are separated by a center groove in each rib.

Seventh Embodiment

Figure 23:
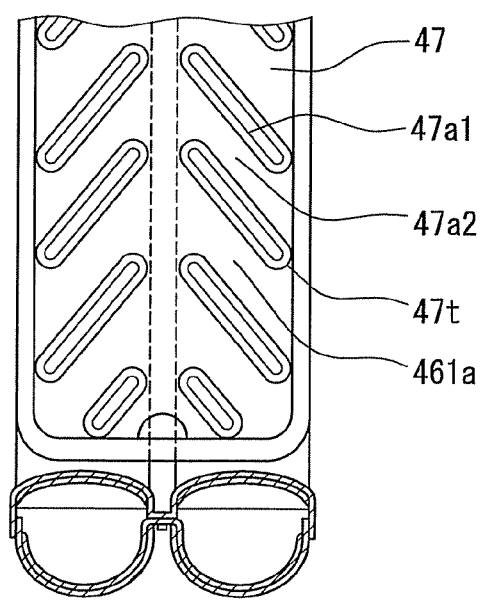
FIG. 23 is a side view showing a part of rib shape on a surface of a cold storage container in an evaporator, according to a seventh embodiment of the invention.

Next, a seventh embodiment of the invention will be described. FIG. 23 is a side view showing a part of rib shapes on a surface of a cold storage container 47 in an evaporator, according to a seventh embodiment of the invention. In the above-described sixth embodiment, the ribs with the left and right separated slanting shapes are arranged substantially by the same pitch to be overlapped from the top direction to the bottom direction of the cold storage container 47. However, in the seventh embodiment, as shown in FIG. 23, the ribs having the left and right separated slanting shapes separated at its width center are arranged by different pitches to be overlapped from the top direction to the bottom direction of the cold storage container 47.

In the above examples shown in FIGS. 20 to 23, the reverse V-shaped ribs or the slanting-shaped ribs are arranged on the surface of the cold-storage container 47 such that the plural protrusion portions 47a1 or the plural recess portions 47a2 are overlapped in the top-bottom direction of the cold-storage container 47. Furthermore, in the ribs, the left and right slanting portions, through which condensed water flows from a mountain tip portion separately to the left and right sides, are formed to extend to left and right two ends 47t of the cold storage container 47.

Accordingly, a large part of the generated condensed water is discharged to outside from the two ends 47t on the outside surface of the cold storage container 47. Therefore, it is difficult for the condensed water to be stored in a lower portion of the cold storage container 47, thereby preventing a freezing break in which the refrigerant tube 45 and the cold storage container 47 are broken in the lower portion.

Furthermore, in the plural protrusion portions 47a1 or the plural recess portions 47a2, the left and right slanting portions, through which condensed water flows from a mountain tip portion separately to the left and right sides, are formed to extend to left and right two ends 47t on the outside surface of the cold storage container 47. In addition, as shown in FIG. 20, the plural protrusion portions 47a1 or the plural recess portions 47a2 are provided, such that a cross angle θ between a straight line and an extending line of the slanting portions are set in a range of 30-60 degrees. Here, the straight line is a connection line connecting a pair of the left and right two ends 47t by the shortest distance, as shown in FIG. 20. Thus, even when the vehicle is tilted on a slop, a draining performance of the condensed water can be sufficiently obtained.

Furthermore, the protrusion portions 47a1 of the cold storage container 47 and the refrigerant tube 45 are brazed to be in closely contact, by an area equal to or larger than 80% with respect to the opposite surface between the plural protrusion portions 47a1 of the cold storage container 47 and the refrigerant tube 45. Thereby, condensed water can be certainly discharged to the outside of the cold storage container 47 along the slanting portions of the protrusion portions 47a1.

Eighth Embodiment

Next, an eighth embodiment of the invention will be described. In the above-described embodiments, the refrigerant passage portion of the evaporator 40 is configured by the headers 41, 42, 43, 44 and the refrigerant tubes 45 located between the headers 41, 42, 43, 44, as shown in FIGS. 2 and 3.

The respective refrigerant tubes 45 are made to communicate with corresponding headers 41, 42, 43, 44 at the ends of the refrigerant tubes 45. Moreover, each refrigerant tube 45 is a flat tube having multi-holes, which is formed by the extrusion process to have therein plural refrigerant passages extending in the tube longitudinal direction. The ribs on an uneven surface can be formed via the extrusion process by using a pressurization roller, similarly to the method described in JP 2004-3787A.

In the eighth embodiment, plural pairs of plates, each pair having integrated tank portion and refrigerant tube portion, are stacked in a stacking direction, thereby forming a heat exchanger. A stack-type heat exchanger described in JP 2001-221535 can be used and incorporated by reference in the present embodiment.

The ribs with the uneven shape, composed of the protrusion portions 47a1 and the recess portions 47a2, can be formed on a surface of a cup-shaped tube (drawn-cup tube) formed by overlapping a pair of plates, by using a method described in JP 2004-3787A that is incorporated by reference in the present embodiment. The contents described in JP 2004-3787A and JP 2001-221535A can be incorporated herein by reference, as the technical contents of the present specification.

Figure 24:
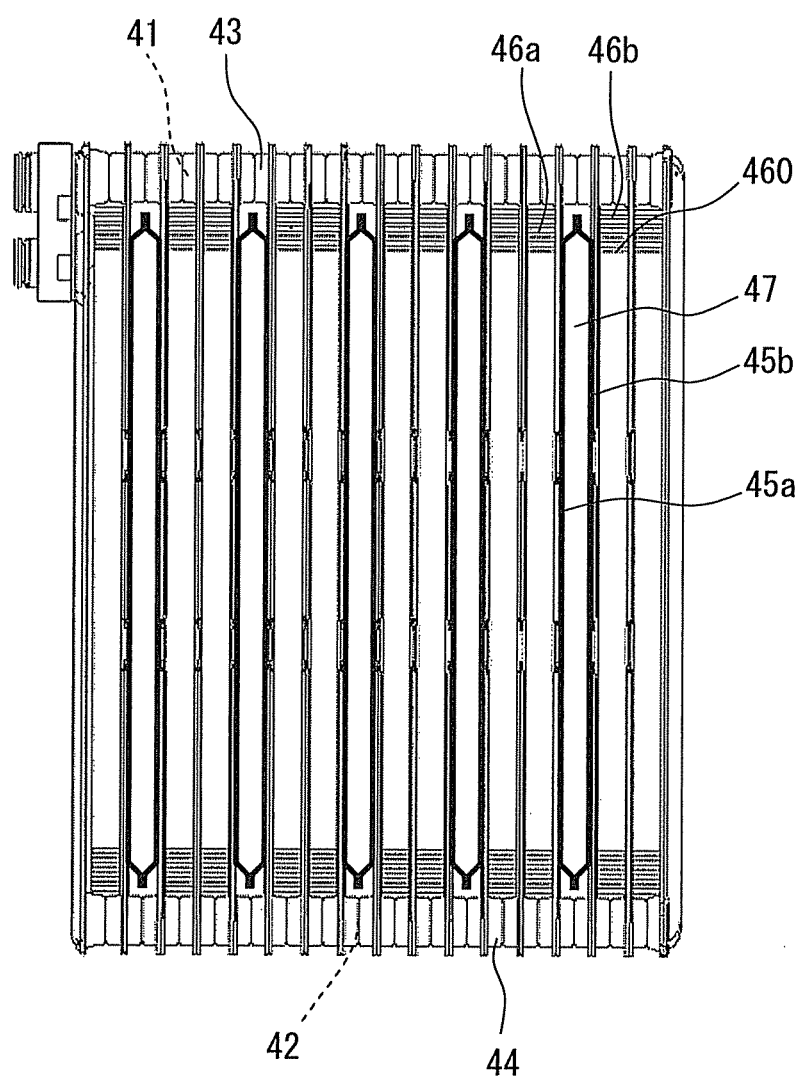
FIG. 24 is a front view showing an evaporator with a cold storage material, formed by stacking plates, according to an eighth embodiment of the invention.
Figure 25:
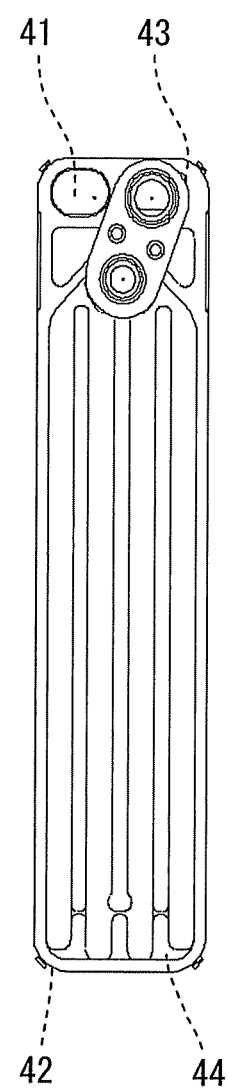
FIG. 25 is a left side view showing the evaporator with a cold storage material of FIG. 24.

FIG. 24 is a front view of an evaporator with a cold storage material in the eighth embodiment formed, by the above-mentioned stacking plates. FIG. 25 is a left side view showing the evaporator with the cold storage material of FIG. 24. As shown in FIG. 24 and FIG. 25, the tank portion and refrigerant tube portion of the evaporator are formed integrally by overlapping a pair of plates. Plural pairs of the overlapped plates are stacked, and the cold storage containers 47 are inserted partially between the stacked parts. In FIGS. 24 and 25, uneven shapes on the surface of the cold-storage container 47 or the refrigerant tube 45 are not shown. Moreover, in FIG. 24 and FIG. 25, parts corresponding those of FIG. 2 are indicated by the same reference numbers.

Figure 26A:
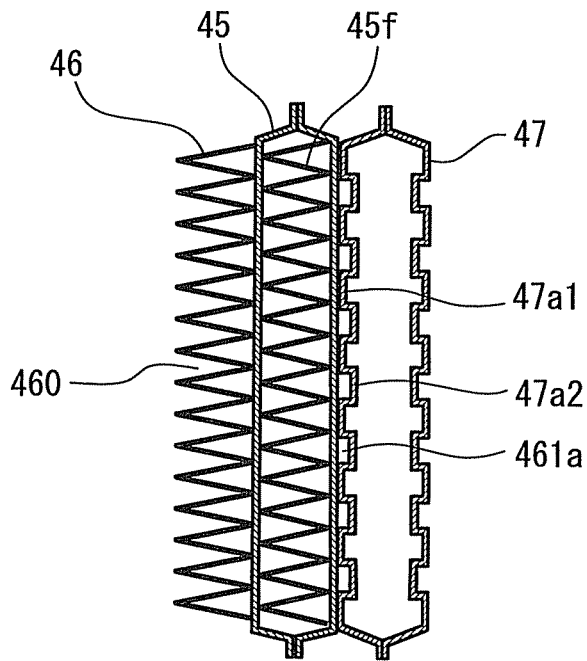
FIGS. 26A and 26B are schematic sectional views showing in contrast, an evaporator in which a refrigerant tube is manufactured by a drawn-cup tube, and an evaporator in which a refrigerant tube is manufactured by extrusion, according to the eighth embodiment of the invention.
Figure 26B:
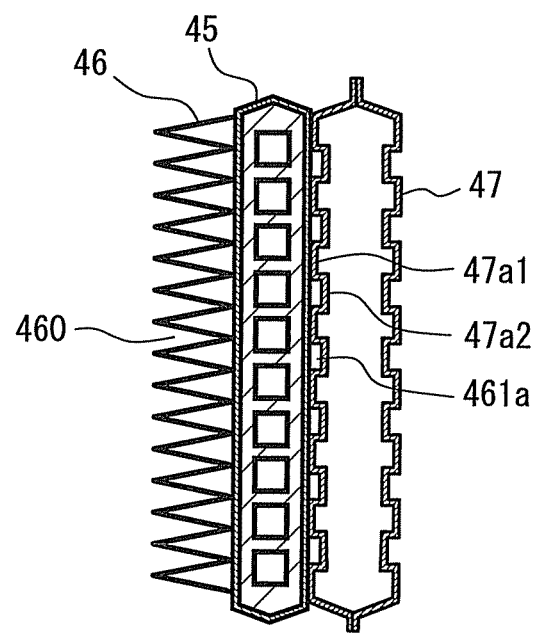

FIGS. 26A and 26B are schematic sectional views by comparison, showing an evaporator in which a refrigerant tube is manufactured by a drawn-cup tube according to the eighth embodiment, and an evaporator in which a refrigerant tube is manufactured by extrusion. That is, a refrigerant tube 45 of the eighth embodiment shown in FIG. 26A is a drawn-cup tube.

In FIG. 26A, an air-side fin 46 is provided in a cooling air passage 460 on the left side, a refrigerant tube 45 of a drawn-cup type having therein an inner fin 45f is provided at one side of the air-side fin 46, and a cold storage container 47 having an uneven surface is bonded to a surface of the refrigerant tube 45 opposite to the surface on the air side.

The air-side fin 46, the refrigerant tube 45 and the cold storage container 47 are configured as one unit. For example, Plural units can be overlapped to configure an evaporator. Another air-side fin 46 may be bonded to the right surface of the cold storage container 47 shown in FIG. 26A to form a unit. Alternatively, another refrigerant tube 45 having therein an inner fin 45f may be bonded to the right surface of the cold storage container 47 to form a unit.

The refrigerant tube 45 of FIG. 26B is formed by extrusion similarly to the first embodiment. FIG. 26B is a modification of the first embodiment. In FIG. 26B, an inner fin 47f is not provided in the cold storage container 47, which is different from the first embodiment shown in FIG. 4. In FIGS. 26A and 26B, the evaporator formed by using a drawn-cup method with laminated plates, is compared with the evaporator formed by extrusion.

Ninth Embodiment

Figure 27A:
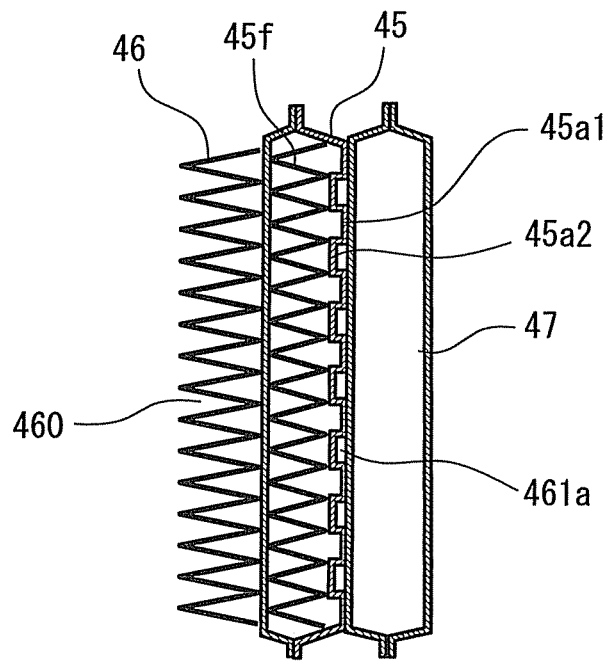
FIGS. 27A and 27B are schematic sectional views showing in contrast, an evaporator in which a refrigerant tube is manufactured by a drawn-cup tube, and an evaporator in which a refrigerant tube is manufactured by extrusion, according to a ninth embodiment of the invention.
Figure 27B:
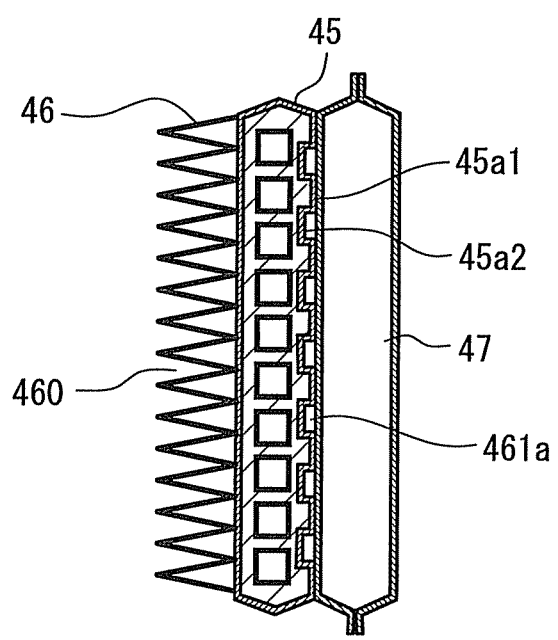

Next, a ninth embodiment of the invention will be described. FIGS. 27A and 27B are schematic sectional views by comparison, showing an evaporator in which a refrigerant tube is manufactured by a drawn-cup tube, and an evaporator in which a refrigerant tube is manufactured by extrusion, according to the ninth embodiment;

That is, a refrigerant tube 45 of the ninth embodiment shown in FIG. 27A is a drawn-cup tube. In FIG. 27A, an air-side fin 46 is provided in a cooling air passage 460 on the left side, and a refrigerant tube 45 of a drawn-cup type having therein a refrigerant tube fin 45f (inner fin) is provided at one side of the air-side fin 46.

One surface of the refrigerant tube 45 is formed in uneven to have protrusion portions 45a1 as ribs, and recess portions 45a2. A flat cold storage container 47 without an uneven portion on the surface is bonded to a surface of the refrigerant tube 45 opposite to the surface of the air-side fin 46. Thus, a cold-storage side air passage 461a is formed between the recess portions 45a2 of the refrigerant tube 45 and the flat surface of the cold storage container 47.

The air-side fin 46, the refrigerant tube 45 and the cold storage container 47 are configured as one unit. For example, Plural units can be overlapped to configure an evaporator. Another air-side fin 46 may be bonded to the right surface of the cold storage container 47 shown in FIG. 27A to form a unit. Alternatively, another refrigerant tube 45 having therein an inner fin 45f may be bonded to the right surface of the cold storage container 47 to form a unit.

The refrigerant tube 45 of FIG. 27B is formed by extrusion similarly to the first embodiment of FIG. 4. FIG. 27B is a modification of the first embodiment. In FIG. 27B, the surface of the cold storage container 47 is formed to be flat without an uneven portion, the protrusion portions 45a1 and the recess portions 45a2 are formed on the one surface of the refrigerant tube 45 to form ribs, and an inner fin 47f is not provided in the cold storage container 47, which are different from the above-described first embodiment. In FIGS. 27A and 27B, the evaporator formed by using a drawn-cup method with laminated plates, is compared with the evaporator formed by extrusion.

Tenth Embodiment

Figure 28:
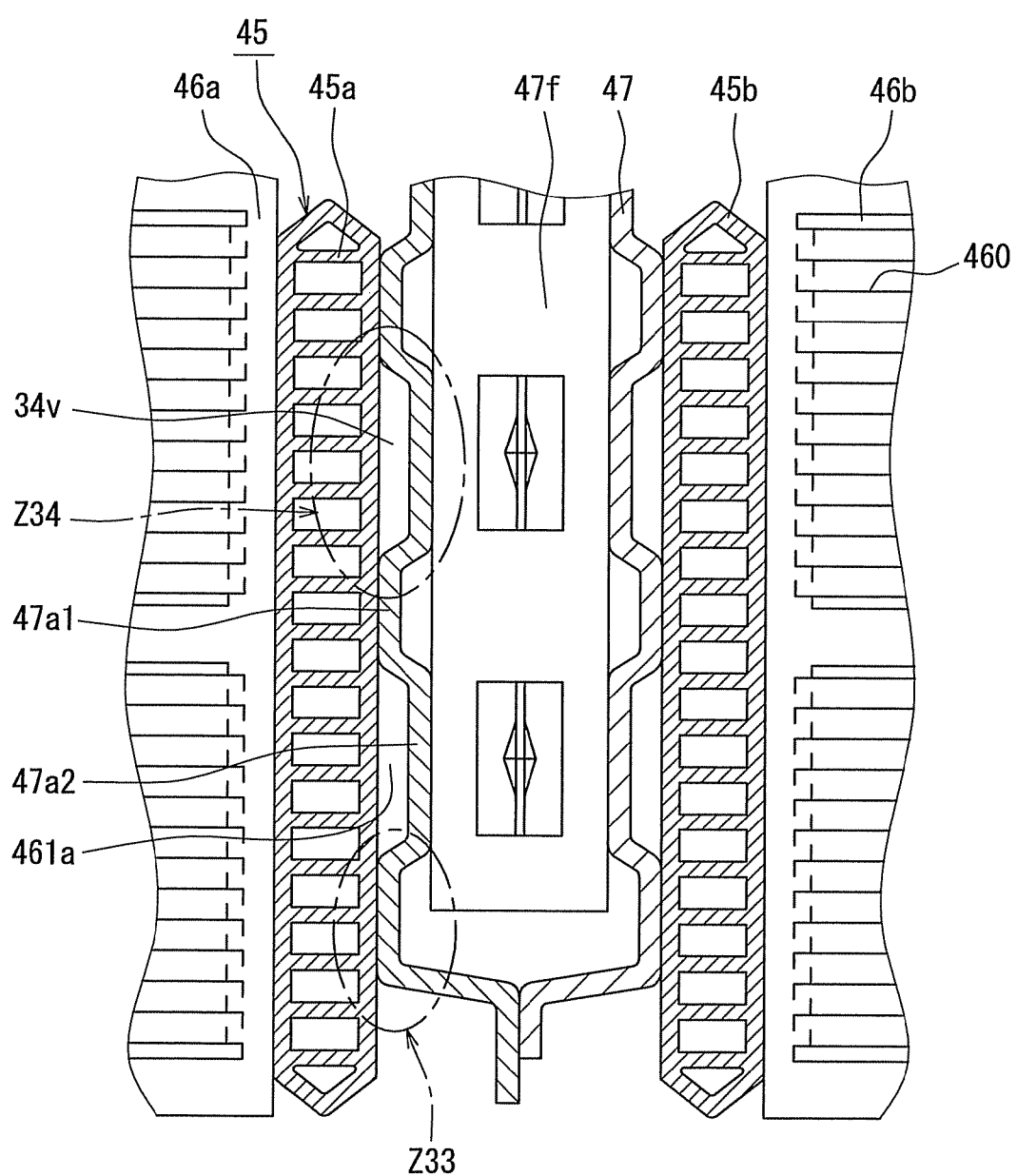
FIG. 28 is a schematic sectional view showing a part of an evaporator similar to FIG. 4, according to a tenth embodiment of the invention.
Figure 29:
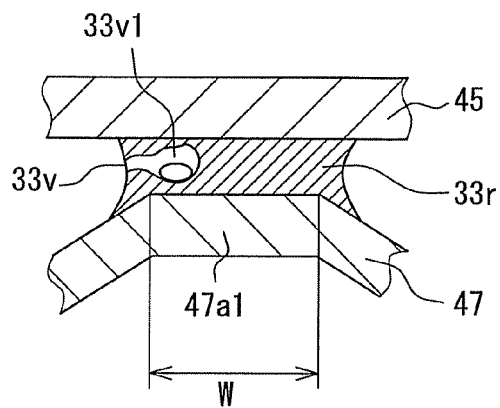
FIG. 29 is an enlarged schematic sectional view showing a part Z33 of FIG. 28.
Figure 30:
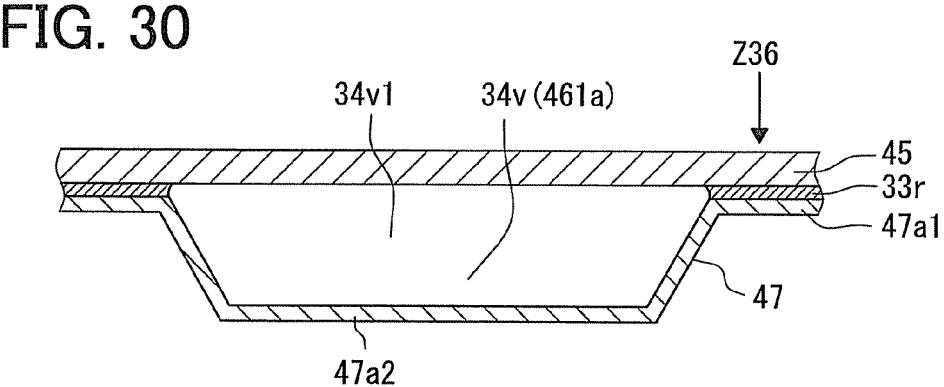
FIG. 30 is an enlarged schematic sectional view showing a part Z34 of FIG. 28.
Figure 31:
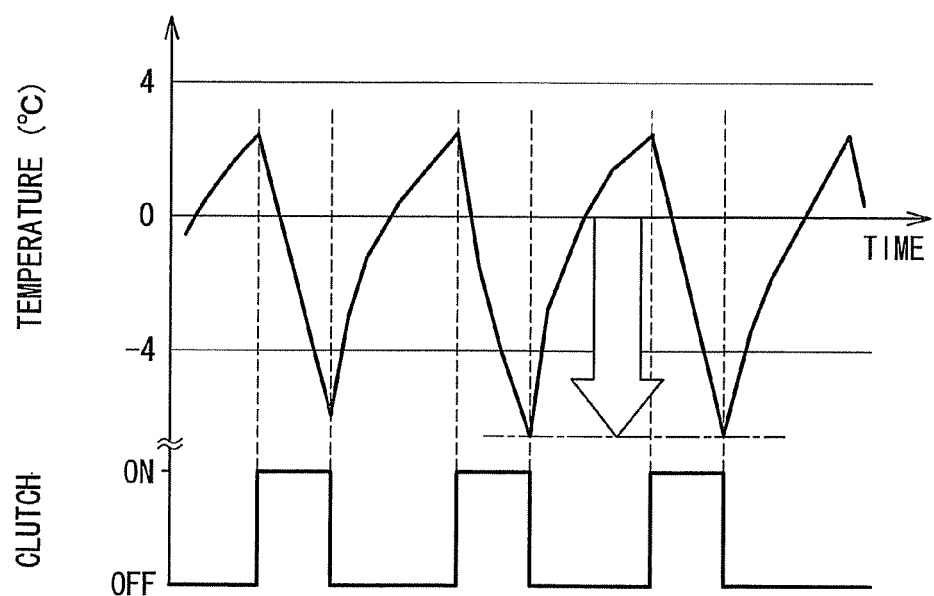
FIG. 31 is a graph showing a variation state of an evaporator temperature in accordance with an interruption operation of a compressor according to a tenth embodiment of the invention.
Figure 32:
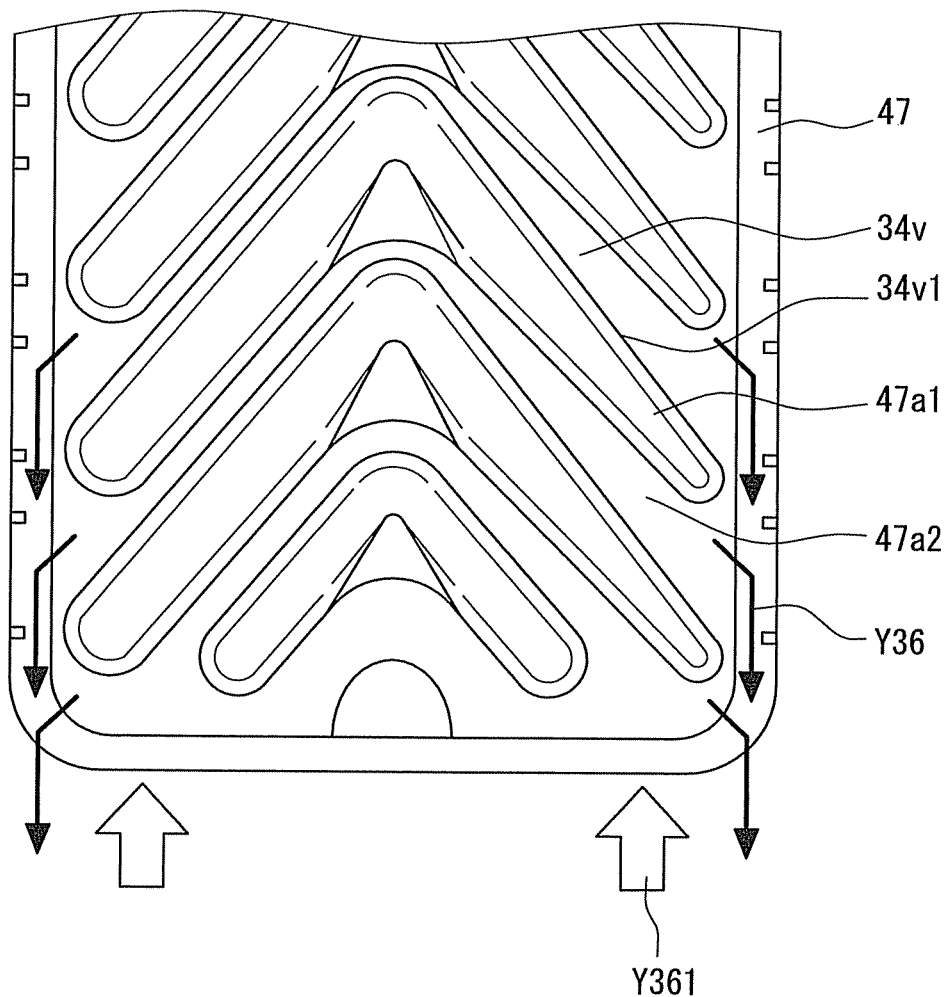
FIG. 32 is a side view showing reverse V-shaped ribs formed on a surface of a cold storage container of the evaporator of FIG. 28.

Next, a tenth embodiment of the invention will be described. FIG. 28 is a schematic sectional view showing a part of an evaporator similar to FIG. 4 of the first embodiment, according to the tenth embodiment of the invention. FIG. 29 is an enlarged schematic sectional view showing a part Z33 of FIG. 28;

FIG. 30 is an enlarged schematic sectional view showing a part Z34 of FIG. 28; FIG. 31 is a graph showing a variation state of an evaporator temperature in accordance with an interruption operation of a clutch connected to a compressor according to the tenth embodiment. FIG. 32 is a side view showing reversed V-shaped ribs formed on a surface of a cold storage container 47 of the evaporator of FIG. 28.

As shown in FIG. 28, the refrigerant tubes 45 are multi-hole tubes, each of which has therein a plurality of refrigerant passages extending in a tube longitudinal direction. Left and right refrigerant tubes 45a and 45b (45) are arranged at two sides of a cold storage container 47 having therein an inner fin 47f, and two cooling air passages 460 for performing heat exchange with air are provided respectively at left and right sides of the left and right refrigerant tubes 45a and 45b.

The refrigerant tube 45 and the cold storage container 47 contact at positions, and are bonded at the contact positions by a brazing material 33r, as shown in FIG. 29. When a void 33v exists in the brazing material 33v1, the condensed water 33v1 may stay in the void 33v of the brazing material 33v1.

In the cold-storage side air passage 461a formed by the recess portions 47a2 on the surface of the cold storage container 47 of FIG. 28, a space 34v is provided as shown in FIG. 30. When air to be conditioned is blown by a cooling fan (not shown), air flows in the space 34v, and water contained in air is condensed as a condensed water 34v1. In this case, the condensed water 34v1 easily stays in the space 34v. The space 34v is adapted as the cold-storage side air passage 461a, when the cold storage material releases cold in the cold storage container 47.

As shown in FIG. 31, the temperature of the evaporator (cold storage heat exchanger) changes to be repeated in accordance with interruption of a clutch connected to the compressor 10 of FIG. 1, thereby repeating freezing and solution of condensed water as shown in FIG. 31. In order to prevent a freezing break, a width W of a bonding flat portion of FIG. 29 is set equal to or smaller than 0.8 mm.

Furthermore, the ribs formed by the protrusion portions 47a1 adjacent to the recess portions 47a2 are formed in reverse V-shape, as shown in FIG. 32 when being viewed from the arrow Z36 of FIG. 30. Therefore, the condensed water 34v1, staying in the space 34v of FIG. 30 formed by the recess portion 47a2 on the surface of the cold storage container 47, can be discharged outside of the cold storage container 47, as in arrows Y36 of FIG. 32.

The width dimension of the recess portion 47a2 between the protrusion portions 47a1 is set, such that condensed water can be drawn in the direction shown by the arrow Y361 from bottom by using the clearances between the protrusion portions 47a1. Thus, even when condensed water becomes ice, the ice can easily fall on the surface of the cold storage container 47, and can be easily removed to the outside. Therefore, it can prevent a stress for causing a freezing break from being generated.

In the cold storage heat exchanger in which the cold storage container 47 is integrated with the cooling fins 46a, 46b of the cooling air passage 460 for air-conditioning of the vehicle compartment, if condensed water stays in the cold-storage side air passage 461a between the refrigerant tube 45 and the cold storage container 47 so that a freezing (frost) of the condensed water is generated in a low load, the cold storage container 47 and the refrigerant tube 45 may be broken. According to the tenth embodiment, the reverse V-shaped ribs are arranged in the spaces between the refrigerant tube 45 and the cold storage container 47 as shown in FIG. 32, so as to reduce an amount of condensed water staying in the spaces between the refrigerant tube 45 and the cold storage container 47.

Thus, in the tenth embodiment, it can restrict condensed water on the cold storage container 47 from flowing, from an upper side rib to a lower side rib on the surface of the cold storage container 47. As a result, the amount of the condensed water staying between the refrigerant tube 45 and the cold storage container 47 can be reduced in the cold storage heat exchanger. Furthermore, even when the freezing of the condensed water is caused, it can easily remove the generated ice to an outer side from the space between the refrigerant tube 45 and the cold storage container 47.

What is claimed is:

1. A cold storage heat exchanger configuring a refrigerant cycle device together with a compressor driven by a vehicle-running power source to compress and discharge a refrigerant, a radiator configured to cool a high temperature refrigerant, and a decompression device configured to decompress the cooled refrigerant, the cold storage heat exchanger comprising:

a plurality of refrigerant tubes having therein refrigerant passages, and arranged to provide a clearance therebetween;

a cold storage container that is bonded to a refrigerant tube and defines a compartment receiving a cold storage material;

an inner fin arranged inside of the cold storage container;

a cooling air passage in which air flows to cool a space to be cooled in a cold storage time of the cold storage material and in a cold release time of the cold storage material, the cooling air passage being provided to contact a surface of the refrigerant tube on a side opposite to the cold storage container bonded to the refrigerant tube; and an air-side fin arranged in the cooling air passage and thermally connected to the refrigerant tube, wherein the cold storage container has a concave-convex surface and includes a plurality of recess portions bonded to the inner fin, and a plurality of protrusion portions that protrude outward on an outer side of the recess portions, the protrusion portions of the cold storage container are bonded to an outer surface of the refrigerant tube, the inner fin has a dimension to be bonded to the recess portions;

the cooling air passage contacts another refrigerant tube on an opposite side from the refrigerant tube bonded to the cold storage container, such that the cooling air passage is disposed between two of the refrigerant tubes, and the another refrigerant tube contacts another cooling air passage on an opposite side from the cooling air passage contacting the refrigerant tube bonded to the cold storage container.

2. The cold storage heat exchanger according to claim 1, wherein none of the protrusion portions is bonded to the inner fin.

3. The cold storage heat exchanger according to claim 1, wherein the inner fin has a corrugated shape, peaked parts of the corrugated shape of the inner fin are bonded to the recess portions of the cold storage container, and the inner fin and the cold storage container define an inner path therebetween.

4. The cold storage heat exchanger according to claim 1, wherein the dimension of the inner fin is uniform.

5. The cold storage heat exchanger according to claim 1, wherein a ratio of a contact area between the cold storage container and the refrigerant tube is set in a range of 10% to 50% in a case where an outer surface of the cold storage container partially contacts an outer surface of the refrigerant tube due to the protrusion portions and the recess portions, when the contact area is defined as 100% in a case where the outer surface of the cold storage container entirely contacts the outer surface of the refrigerant tube.

6. The cold storage heat exchanger according to claim 1, wherein the protrusion portions of the cold storage container protrude outward from the recess portions of the cold storage container.

7. The cold storage heat exchanger according to claim 1, wherein the protrusion portions and the recess portions of the cold storage container define cold-storage side air passages through which air flows between the cold storage container and the refrigerant tube.

8. The cold storage heat exchanger according to claim 1, wherein the air is cooled in the cooling air passage by cold of the refrigerant passing through the refrigerant tubes during operation of the compressor, and the air is cooled in the cooling air passage by cold of the cold storage material in the cold release time during stoppage of the compressor.

9. The cold storage heat exchanger according to claim 2, wherein the air is cooled in the cooling air passage by cold of the refrigerant passing through the refrigerant tubes during operation of the compressor, and the air is cooled in the cooling air passage by cold of the cold storage material in the cold release time during stoppage of the compressor.

* * * * *